US012647544B2

(12) United States Patent
Kim et al.

(10) Patent No.: US 12,647,544 B2
(45) Date of Patent: Jun. 2, 2026

(54) ELECTRONIC APPARATUS FOR CORRECTING VIDEO BASED ON CORRECTED GAIN INFORMATION AND CONTROL METHOD THEREOF

(71) Applicant: Samsung Electronics Co., Ltd., Suwon-si (KR)

(72) Inventors: Jongho Kim, Suwon-si (KR); Jonghwan Kim, Suwon-si (KR); Guiwon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/824,516

(22) Filed: Sep. 4, 2024

(65) Prior Publication Data

US 2025/0193353 A1 Jun. 12, 2025

Related U.S. Application Data

(63) Continuation of application No. PCT/KR2024/012236, filed on Aug. 16, 2024.

(30) Foreign Application Priority Data

Dec. 11, 2023 (KR) ........................ 10-2023-0178330

(51) Int. Cl.
| | |
|---|---|
| *H04N 9/31* | (2006.01) |
| *G06T 7/00* | (2017.01) |
| *G06T 7/90* | (2017.01) |

(52) U.S. Cl.
CPC ......... *H04N 9/3182* (2013.01); *G06T 7/0002* (2013.01); *G06T 7/90* (2017.01);
(Continued)

(58) Field of Classification Search
CPC ....... H04N 9/3182; G06T 7/0002; G06T 7/90; G06T 2207/10016; G06T 2207/10024; G06T 2207/30168
See application file for complete search history.

(56) References Cited

U.S. PATENT DOCUMENTS

| | | | | |
|---|---|---|---|---|
| 8,913,194 B2 | 12/2014 | Kim et al. | | |
| 9,030,553 B2 * | 5/2015 | Shin ........................ | H04N 7/18 348/135 |

(Continued)

FOREIGN PATENT DOCUMENTS

| | | |
|---|---|---|
| JP | 2010130481 A | 6/2010 |
| JP | 2013197797 A | 9/2013 |

(Continued)

OTHER PUBLICATIONS

Search Report and Written Opinion dated Dec. 12, 2024 issued in International Patent Application No. PCT/KR2024/012236.

*Primary Examiner* — Nathan J Flynn
(74) *Attorney, Agent, or Firm* — NIXON & VANDERHYE P.C.

(57) ABSTRACT

An electronic apparatus includes: a video projector; a first sensor; a second sensor; a memory; and at least one processor. The at least one processor is configured to: acquire projection distance information to a projection surface based on sensing data acquired through the first sensor, acquire illuminance information based on the sensing data acquired through the second sensor, acquire gain information for each region included in the projection surface based on the projection distance information and the illuminance information, correct the gain information for each region based on correlation information between the projection distance information and image quality information and correlation information between the illuminance information and the image quality information, acquire an output video by
(Continued)

correcting the input video based on the corrected gain information for each region, and control the video projector to project the output video onto the projection surface.

23 Claims, 17 Drawing Sheets

(52) U.S. Cl.
     CPC .............. *G06T 2207/10016* (2013.01); *G06T 2207/10024* (2013.01); *G06T 2207/30168* (2013.01)

(56) References Cited

U.S. PATENT DOCUMENTS

| | | | |
|---|---|---|---|
| 9,131,225 | B2 | 9/2015 | Matsumoto |
| 9,596,441 | B2 | 3/2017 | Shin |
| 12,374,245 | B2 | 7/2025 | Kwon |
| 2011/0149044 | A1 | 6/2011 | Snin |
| 2013/0082993 | A1 | 4/2013 | Kim et al. |
| 2014/0168516 | A1* | 6/2014 | Naccari .................... H04N 9/67 348/571 |
| 2018/0157035 | A1 | 6/2018 | Fujita |
| 2025/0142036 | A1* | 5/2025 | Park ..................... H04N 9/3182 |

FOREIGN PATENT DOCUMENTS

| | | |
|---|---|---|
| JP | 2017003910 A | 1/2017 |
| JP | 2020-118758 | 8/2020 |
| KR | 100763239 B1 | 10/2007 |
| KR | 10-2010-0023240 | 3/2010 |
| KR | 10-2011-0071217 | 6/2011 |
| KR | 20130035682 A | 4/2013 |
| KR | 10-2013-0074565 | 7/2013 |
| KR | 10-2015-0080678 A | 7/2015 |
| KR | 10-2023-0026126 A | 2/2023 |
| KR | 20230092682 A | 6/2023 |

* cited by examiner

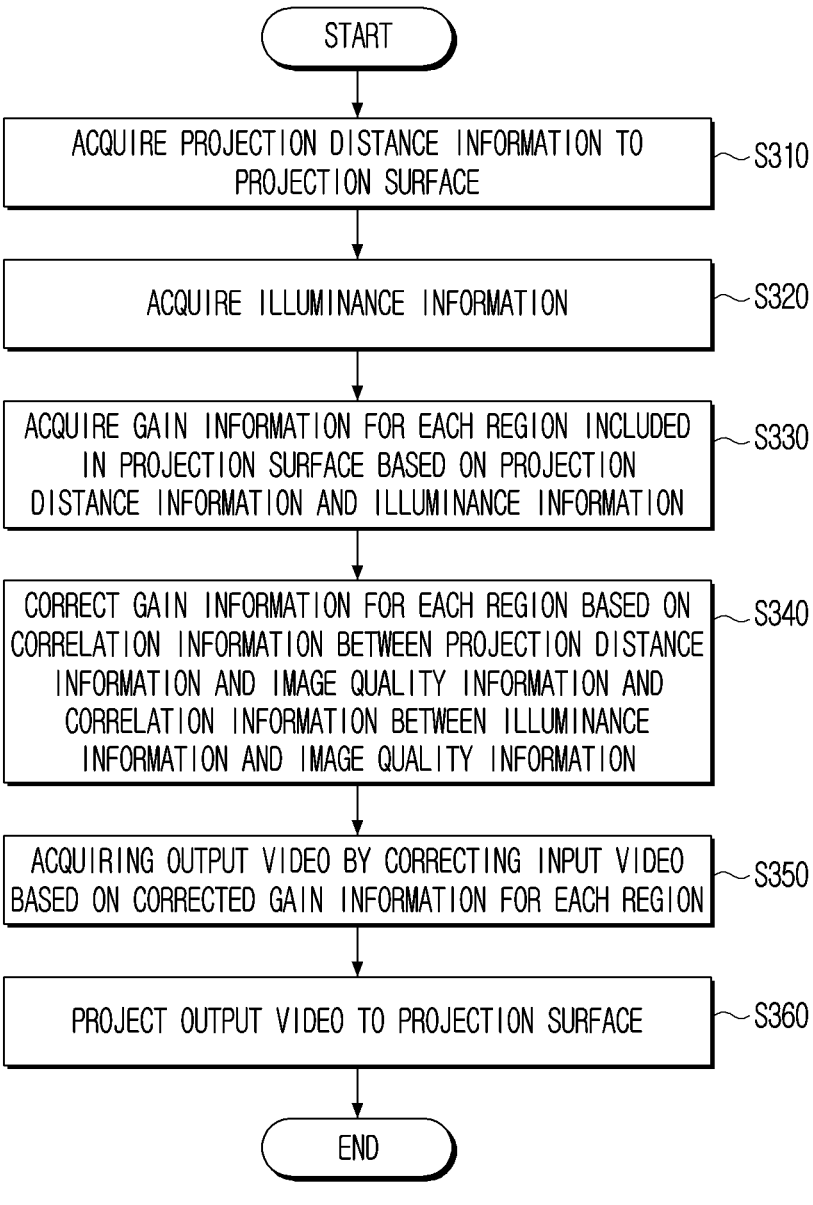

START

ACQUIRE PROJECTION DISTANCE INFORMATION TO PROJECTION SURFACE —S310

ACQUIRE ILLUMINANCE INFORMATION —S320

ACQUIRE GAIN INFORMATION FOR EACH REGION INCLUDED IN PROJECTION SURFACE BASED ON PROJECTION DISTANCE INFORMATION AND ILLUMINANCE INFORMATION —S330

CORRECT GAIN INFORMATION FOR EACH REGION BASED ON CORRELATION INFORMATION BETWEEN PROJECTION DISTANCE INFORMATION AND IMAGE QUALITY INFORMATION AND CORRELATION INFORMATION BETWEEN ILLUMINANCE INFORMATION AND IMAGE QUALITY INFORMATION —S340

ACQUIRING OUTPUT VIDEO BY CORRECTING INPUT VIDEO BASED ON CORRECTED GAIN INFORMATION FOR EACH REGION —S350

PROJECT OUTPUT VIDEO TO PROJECTION SURFACE —S360

END

FIG. 7

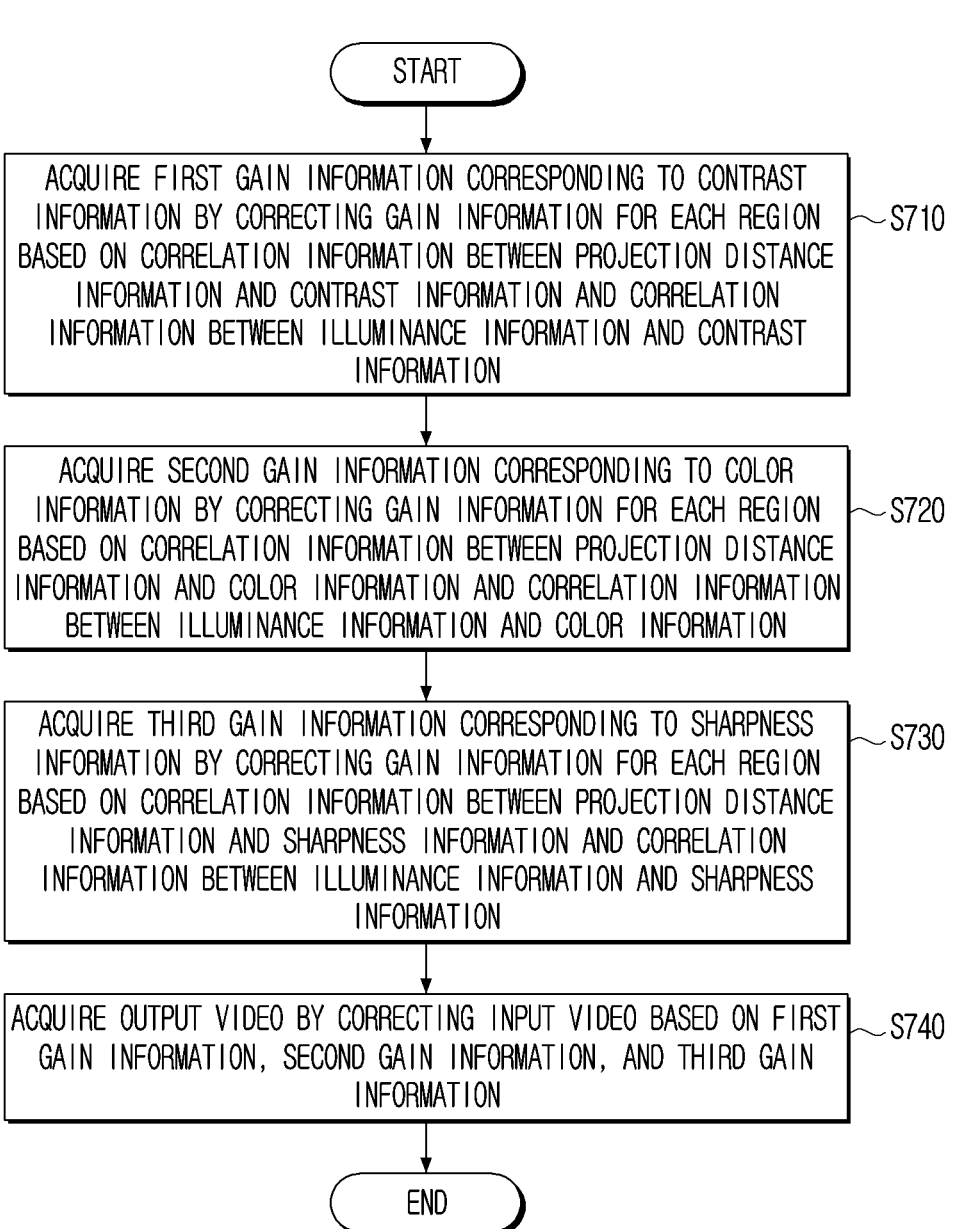

START

ACQUIRE FIRST GAIN INFORMATION CORRESPONDING TO CONTRAST INFORMATION BY CORRECTING GAIN INFORMATION FOR EACH REGION BASED ON CORRELATION INFORMATION BETWEEN PROJECTION DISTANCE INFORMATION AND CONTRAST INFORMATION AND CORRELATION INFORMATION BETWEEN ILLUMINANCE INFORMATION AND CONTRAST INFORMATION — S710

ACQUIRE SECOND GAIN INFORMATION CORRESPONDING TO COLOR INFORMATION BY CORRECTING GAIN INFORMATION FOR EACH REGION BASED ON CORRELATION INFORMATION BETWEEN PROJECTION DISTANCE INFORMATION AND COLOR INFORMATION AND CORRELATION INFORMATION BETWEEN ILLUMINANCE INFORMATION AND COLOR INFORMATION — S720

ACQUIRE THIRD GAIN INFORMATION CORRESPONDING TO SHARPNESS INFORMATION BY CORRECTING GAIN INFORMATION FOR EACH REGION BASED ON CORRELATION INFORMATION BETWEEN PROJECTION DISTANCE INFORMATION AND SHARPNESS INFORMATION AND CORRELATION INFORMATION BETWEEN ILLUMINANCE INFORMATION AND SHARPNESS INFORMATION — S730

ACQUIRE OUTPUT VIDEO BY CORRECTING INPUT VIDEO BASED ON FIRST GAIN INFORMATION, SECOND GAIN INFORMATION, AND THIRD GAIN INFORMATION — S740

END

FIG. 8A
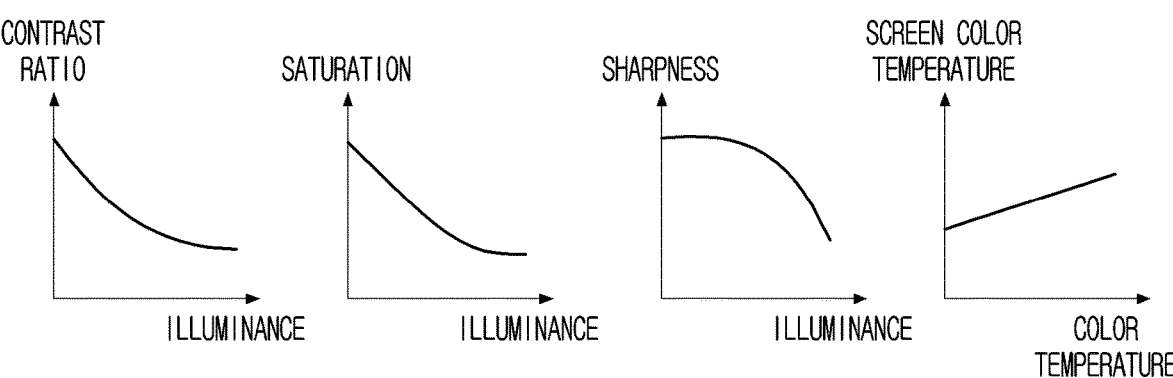
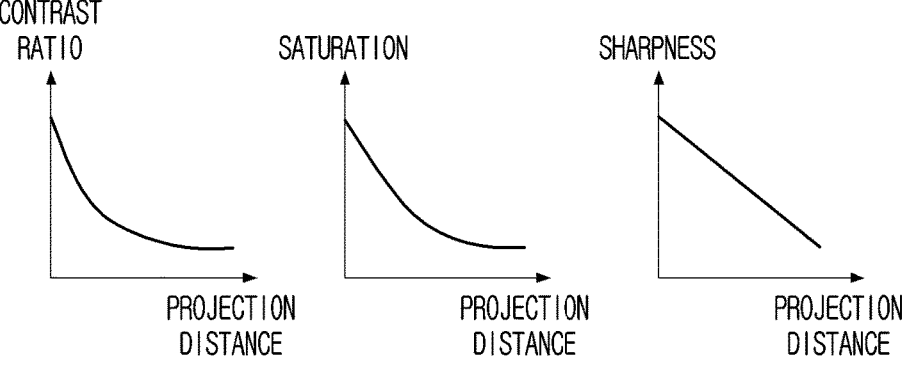

FIG. 8B

| | |
|---|---|
| ILLUMINANCE/PROJECTION DISTANCE–CONTRAST RATIO IS INVERSELY PROPORTIONAL RELATIONSHIP | ILLUMINANCE/PROJECTION DISTANCE ↑ ➡ CONTRAST GAIN ↑ |
| ILLUMINANCE/PROJECTION DISTANCE–SATURATION IS INVERSELY PROPORTIONAL RELATIONSHIP | ILLUMINANCE/PROJECTION DISTANCE ↑ ➡ SATURATION GAIN ↑ |
| ILLUMINANCE/PROJECTION DISTANCE–SHARPNESS IS INVERSELY PROPORTIONAL RELATIONSHIP | ILLUMINANCE/PROJECTION DISTANCE ↑ ➡ SHARPNESS GAIN ↑ |
| LIGHTING COLOR TEMPERATURE–SCREEN COLOR TEMPERATURE IS PROPORTIONAL RELATIONSHIP | LIGHTING COLOR TEMPERATURE ↑ ➡ WHITE BALANCE GAIN ↓ |

FIG. 9

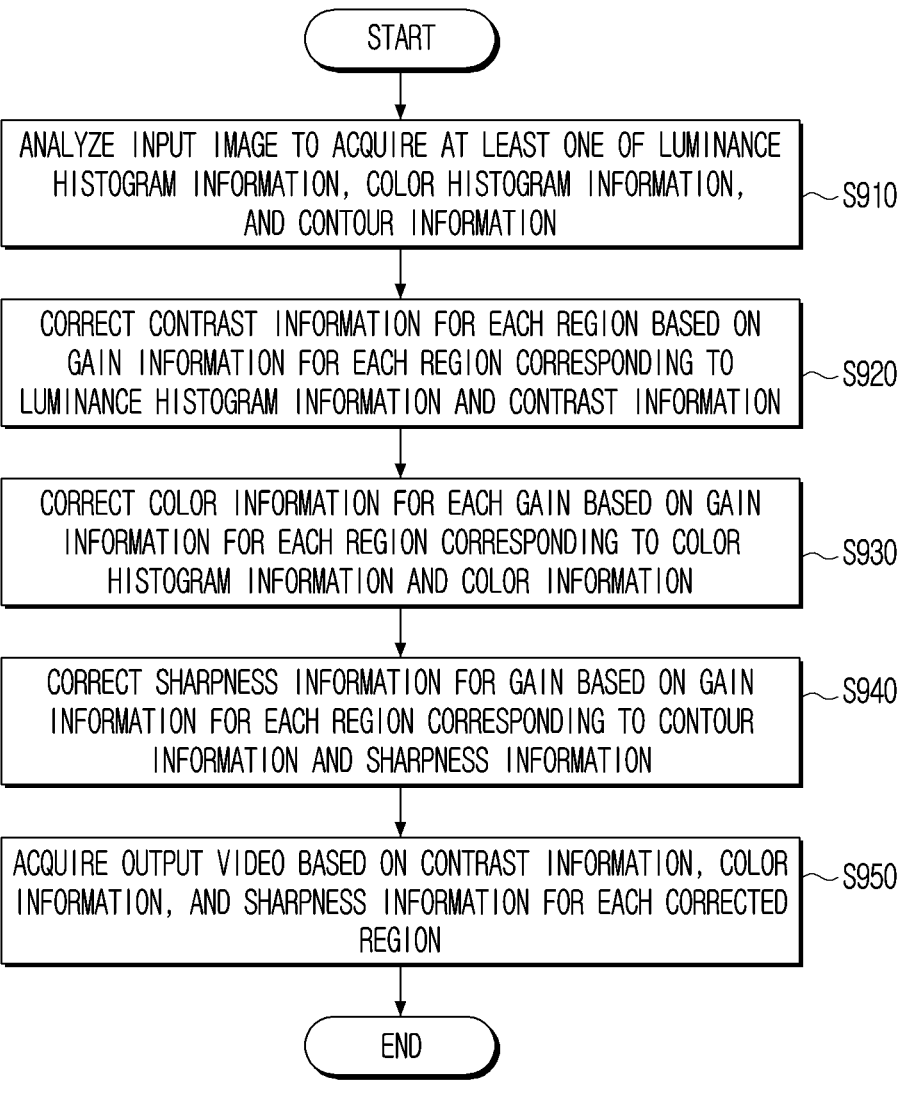

START

ANALYZE INPUT IMAGE TO ACQUIRE AT LEAST ONE OF LUMINANCE HISTOGRAM INFORMATION, COLOR HISTOGRAM INFORMATION, AND CONTOUR INFORMATION ~S910

CORRECT CONTRAST INFORMATION FOR EACH REGION BASED ON GAIN INFORMATION FOR EACH REGION CORRESPONDING TO LUMINANCE HISTOGRAM INFORMATION AND CONTRAST INFORMATION ~S920

CORRECT COLOR INFORMATION FOR EACH GAIN BASED ON GAIN INFORMATION FOR EACH REGION CORRESPONDING TO COLOR HISTOGRAM INFORMATION AND COLOR INFORMATION ~S930

CORRECT SHARPNESS INFORMATION FOR GAIN BASED ON GAIN INFORMATION FOR EACH REGION CORRESPONDING TO CONTOUR INFORMATION AND SHARPNESS INFORMATION ~S940

ACQUIRE OUTPUT VIDEO BASED ON CONTRAST INFORMATION, COLOR INFORMATION, AND SHARPNESS INFORMATION FOR EACH CORRECTED REGION ~S950

END

FIG. 10
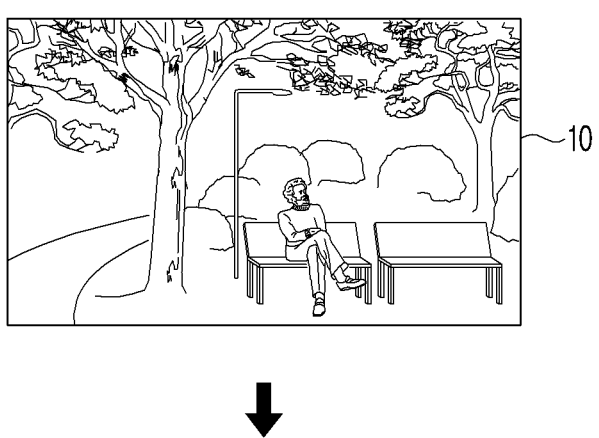
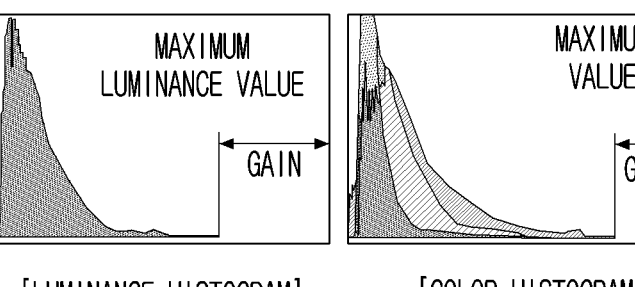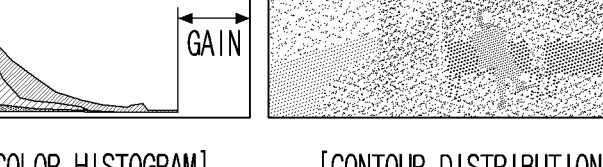
[LUMINANCE HISTOGRAM]     [COLOR HISTOGRAM]     [CONTOUR DISTRIBUTION]

1410                    1420

ELECTRONIC APPARATUS FOR CORRECTING VIDEO BASED ON CORRECTED GAIN INFORMATION AND CONTROL METHOD THEREOF

CROSS-REFERENCE TO RELATED APPLICATIONS

This application is a continuation of International Application No. PCT/KR2024/012236 designating the United States, filed on Aug. 16, 2024, in the Korean Intellectual Property Receiving Office and claiming priority to Korean Patent Application No. 10-2023-0178330, filed on Dec. 11, 2023, in the Korean Intellectual Property Office, the disclosures of each of which are incorporated by reference herein in their entireties.

BACKGROUND

Field

The disclosure relates to an electronic apparatus and a control method thereof, and for example, to an electronic apparatus projecting a video and a control method thereof.

Description of Related Art

In accordance with the development of electronic technology, various types of electronic products have been developed and spread. For example, electronic apparatuses used in various places, such as homes, offices, public places, and the like, have been continuously developed over the recent years.

In particular, beam projectors are being used in various places such as offices, theaters, homes, and stores, and the market is continuously growing. For home/portable beam projectors, the number of products in various form factors is increasing due to the high efficiency and low power consumption of LED light sources, and the market is growing by more than 10 to 15% every year.

In addition, as the wired and wireless interface function between beam projector devices and external devices has recently increased, it has become possible to select and output various contents in real time in various places through Wi-Fi and 5G networks.

SUMMARY

According to an example embodiment of the present disclosure, an electronic apparatus includes: a video projector; a first sensor; a second sensor; a memory configured to store one or more instructions; and at least one processor, comprising processing circuitry, operatively connected to the video projector, the first sensor, the second sensor, and the memory, at least one processor, individually and/or collectively, is configured to execute the one or more instructions and is configured to: acquire projection distance information to a projection surface based on sensing data acquired through the first sensor, acquire illuminance information based on the sensing data acquired through the second sensor, acquire gain information for each region included in the projection surface based on the projection distance information and the illuminance information, correct the gain information for each region based on correlation information between the projection distance information and image quality information and correlation information between the illuminance information and the image quality information, acquire an output video by correcting the input video based on the corrected gain information for each region, and control the video projector to project the output video onto the projection surface.

The image quality information may include at least one of contrast information, color information, and sharpness information, and at least one processor, individually and/or collectively, may be configured to: acquire first gain information corresponding to the contrast information by correcting the gain information for each region based on correlation information between the projection distance information and the contrast information and correlation information between the illuminance information and the contrast information, acquire second gain information corresponding to color information by correcting the gain information for each region based on correlation information between the projection distance information and the color information and correlation information between the illuminance information and the color information, acquire third gain information corresponding to sharpness information by correcting the gain information for each region based on correlation information between the projection distance information and the sharpness information and correlation information between the illuminance information and the sharpness information, and acquire the output video by correcting the input video based on the first gain information, the second gain information, and the third gain information.

At least one processor, individually and/or collectively, may be configured to: analyze the input video to acquire video characteristic information, and acquire the output video by correcting the input video based on the video characteristic information, the first gain information, the second gain information, and the third gain information.

The video characteristic information may include at least one of luminance histogram information, color histogram information, and contour information, and at least one processor, individually and/or collectively, may be configured to: correct the contrast information for each region based on the luminance histogram information and the first gain information, correct the color information for each region based on the color histogram information and the second gain information, and correct the sharpness information for each region based on the contour information and the third gain information.

At least one processor, individually and/or collectively, may be configured to: correct the brightness information and contrast information for each region based on the luminance histogram information and the first gain information, and correct saturation information and color temperature information for each region based on the color histogram information and the second gain information.

At least one processor, individually and/or collectively, may be configured to: identify maximum luminance information of the input video based on the luminance histogram information, adjust a contrast gain for contrast information correction based on the identified maximum luminance information, identify maximum red, green, blue (RGB) information of the input video based on the color histogram information, adjust a saturation gain for saturation information correction based on the identified maximum R/G/B information, identify amount information and magnitude information of a contour included in the input video based on the contour information, and adjust the gain for the sharpness correction based on the identified amount information and magnitude information of the contour.

At least one processor, individually and/or collectively, may be configured to: acquire local gain information for each region by analyzing a change in the image quality information depending on the projection distance information for each of a plurality of regions included in the projection surface, acquire global gain information corresponding to an entire region of the projection surface by analyzing a change in the image quality information according to the illuminance information, and acquire the gain information for each region based on the local gain information and the global gain information.

The local gain information for each region may include a gain map in a form of a gray image whose gain value increases as the projection distance corresponding to each of the plurality of regions increases, and the global gain information may include a gain map in the form of the gray image whose gain value increases as the brightness included in the illuminance information increases.

At least one processor, individually and/or collectively, may be configured to: adjust the gain information so that the gain information for each region increases from a center region to an edge region of the projection surface based on at least one of the projection distance information or size information of the projection surface.

At least one processor, individually and/or collectively, may be configured to: identify a region of interest within the input video, and acquire the output video by correcting the region of interest based on the corrected gain information for each region.

According to an example embodiment of the present disclosure, a method of controlling an electronic apparatus includes: acquiring projection distance information and illuminance information to a projection surface; acquiring gain information for each region included in the projection surface based on the projection distance information and the illuminance information; correcting the gain information for each region based on correlation information between the projection distance information and image quality information and correlation information between the illuminance information and the image quality information; acquiring an output video by correcting the input video based on the corrected gain information for each region; and projecting the output video onto the projection surface.

According to an example embodiment of the present disclosure, there is provided a non-transitory computer-readable medium storing computer instructions to that when executed by at least one processor of the electronic apparatus, individually and/or collectively, cause the electronic device to perform operations including: acquiring projection distance information and illuminance information to a projection surface; acquiring gain information for each region included in the projection surface based on the projection distance information and the illuminance information; correcting the gain information for each region based on correlation information between the projection distance information and the image quality information and correlation information between the illuminance information and the image quality information; acquiring an output video by correcting the input video based on the corrected gain information for each region; and projecting the output video onto the projection surface.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 3 is a flowchart illustrating an example method of controlling an electronic apparatus according to various embodiments;

FIG. 7 is a flowchart illustrating an example method of correcting gain information for each region according to various embodiments;

FIGS. 8A and 8B include graphs and a table illustrating an example method of correcting gain information for each region of a modeling module according to various embodiments;

FIG. 9 is a flowchart illustrating an example video correction method based on gain information and video characteristics for each region according to various embodiments;

FIG. 10 is a diagram illustrating an example video analysis method of a video analysis module according to various embodiments;

DETAILED DESCRIPTION

Figure 1:
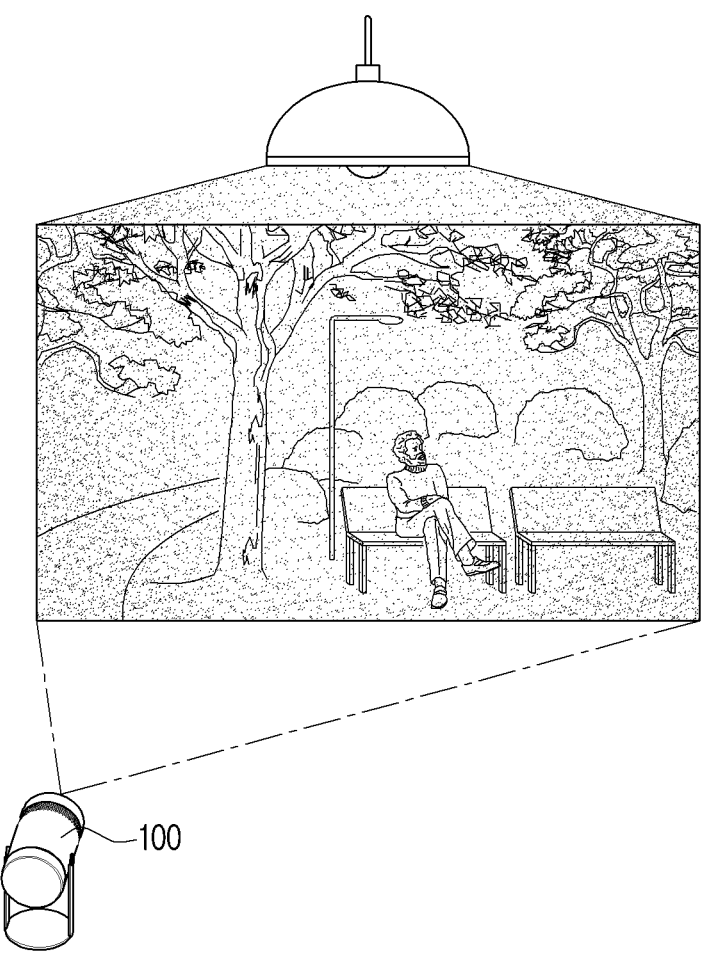
FIG. 1 is a diagram illustrating an example electronic apparatus according to various embodiments.

Terms used in the disclosure are described, and the disclosure will be described in greater detail with reference to the drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms may be arbitrarily chosen. In this case, the meaning of such terms will be mentioned in detail in a corresponding description portion of the disclosure. Therefore, the terms used in embodiments of the disclosure are to be defined on the basis of the meaning of the terms and the contents throughout the disclosure rather than simple names of the terms.

In the disclosure, an expression "have", "may have", "include", "may include", or the like, indicates existence of a corresponding feature (e.g., a numerical value, a function, an operation, a component such as a part, or the like), and does not exclude existence of an additional feature.

In the disclosure, an expression "A or B", "at least one of A and/or B", or "one or more of A and/or B", may include all possible combinations of items enumerated together. For example, "A or B", "at least one of A and B", or "at least one of A or B" may indicate all of 1) a case where only A is included, 2) a case where only B is included, or 3) a case where both of the A and B are included.

Expressions "first," "second," "1ˢᵗ" or "2ⁿᵈ" or the like, used in the present disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component may be directly coupled to another component or may be coupled to another component through the other component (for example, a third component).

An expression "configured (or set) to" used in the disclosure may be replaced by an expression "suitable for", "having the capacity to" "designed to", "adapted to", "made to", or "capable of" depending on a situation. A term "configured (or set) to" may not necessarily refer, for example, to being "specifically designed to" in hardware.

In various situations, an expression "a device configured to" may refer, for example, to what the device may "do" together with other devices or components. For example, a "processor configured (or set) to perform A, B, and C" may refer, for example, to a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

Singular forms include plural forms unless the context clearly indicates otherwise. It should be understood that terms "include" or "formed of" used in the specification specify the presence of features, numerals, steps, operations, components, parts, or combinations thereof mentioned in the disclosure, but do not preclude the presence or addition of one or more other features, numerals, steps, operations, components, parts, or combinations thereof.

In various example embodiments, a 'module' or a 'unit' may perform at least one function or operation, and be implemented by hardware or software or be implemented by a combination of hardware and software. In addition, a plurality of "modules" or a plurality of "units" may be integrated in at least one module and be implemented by at least one processor (not illustrated) except for a "module" or a "unit" that needs to be implemented by specific hardware.

Various elements and regions in the drawings are schematically illustrated. Therefore, the spirit of the disclosure is not limited by relative sizes or intervals illustrated in the accompanying drawings.

FIG. 1 is a diagram illustrating an example of an electronic apparatus according to various embodiments.

An electronic apparatus 100 according to an embodiment may include a function for projecting a video, for example, a projector function. For example, the electronic apparatus 100 may be a projector device that projects a video onto a wall or a projection surface, and the projector device may be an LCD projector or a digital light processing (DLP) type projector using a digital micromirror device (DMD).

In addition, the electronic apparatus 100 may be implemented as a home or industrial display device, a lighting device used in daily life, an audio device including a sound module, a portable communication device (e.g., a smartphone), a computer device, a portable multimedia device, a wearable device, a home appliance, etc. However, it is not limited to the above-mentioned devices, and the electronic apparatus 100 may be implemented as an electronic apparatus 100 having two or more functions of the above-described devices. For example, the electronic apparatus 100 may be used as the display device, the lighting device, or the sound device by turning off the projector function and turning on the lighting function or speaker function according to the operation of the processor, and may be used as an AI speaker including a microphone or a communication device.

As illustrated in FIG. 1, a problem may occur in which visibility of a projector screen is reduced depending on a distance between the electronic apparatus 100 and the projection surface and/or ambient lighting.

Accordingly, various embodiments that can improve the visibility of the projector screen will be described in consideration of the influence of image quality depending on the viewing environment.

Figure 2A:
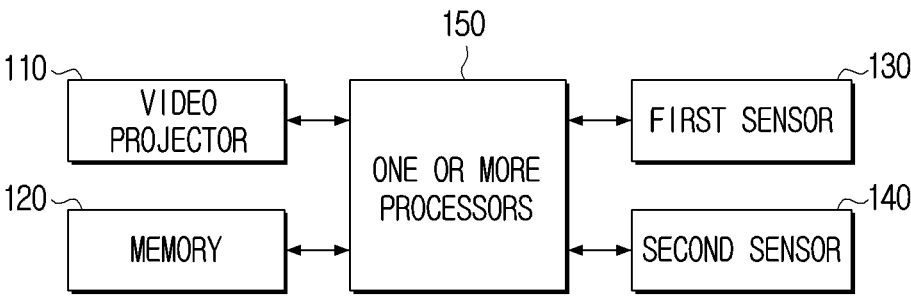
FIG. 2A is a block diagram illustrating an example configuration of an electronic apparatus according to various embodiments.

FIG. 2A is a block diagram illustrating an example configuration of an electronic apparatus according to various embodiments.

Referring to FIG. 2A, the electronic apparatus 100 may include a video projector 110, a memory 120, and one or more processors (e.g., including processing circuitry) 150. The electronic apparatus 100 can be implemented as a projector that projects a video onto a wall or a projection surface, or various types of devices with a video projection function.

Referring to FIG. 2A, the electronic apparatus 100 may include the video projector 110, the memory 120, a first sensor 130, a second sensor 140, and one or more processors 150.

The video projector 110 may perform a function of projecting light for expressing a video to the outside and outputting the video to a projection surface. Here, the projection surface may be part of a physical space where the image is output or may be a separate projection surface. The video projector 110 may include various detailed components such as a light source of at least one of a lamp, an LED, and a laser, a projection lens, and a reflector.

The video projector 110 may project a video onto in one of various projection methods (e.g., cathode-ray tube (CRT) method, liquid crystal display (LCD) method, digital light processing (DLP) method, laser method, etc.). The video projector 110 may include at least one light source.

The video projector 110 may output an image in 4:3 screen ratio, 5:4 screen ratio, and 16:9 wide screen ratio depending on the purpose of the electronic apparatus 100, user settings, etc., and output an image at various resolutions, such as WVGA (854*480), SVGA (800*600), XGA (1024*768), WXGA (1280*720), WXGA (1280*800), SXGA (1280*1024), UXGA (1600*1200), and Full HD (1920*1080), depending on the screen ratio.

The video projector 110 may perform various functions to adjust the projected image under the control of the processor 150. For example, the video projector 110 may perform a zoom in/out function, a lens shift function, etc. The zoom in/out function may include a hardware method that adjusts the screen size by moving the lens and a software method that adjusts the screen size by cropping the image. When the zoom/in/out function is performed, the focus of the image needs to be adjusted. For example, a method for controlling a focus may include a manual focus method, an electric method, etc.

The video projector 110 may automatically analyze the surrounding environment and projection environment without user input and provide zoom/keystone/focus functions. For example, the video projector 110 may automatically provide zoom/keystone/focus functions based on a distance between the electronic apparatus 100 and the projection surface, information on the space where the electronic apparatus 100 is currently located, information on the amount of surrounding light, etc.

The memory 120 may store data necessary for various embodiments. The memory 120 may be implemented in a form of a memory embedded in the electronic apparatus 100 or a form of a memory detachable from the electronic apparatus 100, depending on a data storage purpose. For example, data for driving the electronic apparatus 100 may be stored in the memory embedded in the electronic apparatus 100, and data for an extension function of the electronic apparatus 100 may be stored in the memory detachable from the electronic apparatus 100. The memory embedded in the electronic apparatus 100 may include at least one of, for example, a volatile memory (for example, a dynamic random access memory (DRAM), a static RAM (SRAM), a synchronous dynamic RAM (SDRAM), or the like), a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, or the like), a flash memory (for example, a NAND flash, a NOR flash, or the like), a hard drive, and a solid state drive (SSD)). In addition, the memory 300 detachable from the electronic apparatus 100 may be implemented in the form of the memory card (e.g., compact flash (CF), secure digital (SD), micro secure digital (Micro-SD), mini secure digital (Mini-SD), extreme digital (xD), multimedia card (MMC), etc.), external memory (e.g., USB memory) connectable to a USB port, and the like.

According to an example, the memory 120 may store various information for correcting image quality according to an embodiment. For example, the memory 120 may store correlation information between projection distance information and image quality information and correlation information between illuminance information and image quality information.

A first sensor 130 may include a distance sensor. The distance sensor is a component that measures the distance from the projection surface. For example, the distance sensor may be implemented in various types such as a time of flight (ToF) sensor, an ultrasonic sensor, an infrared sensor, a LIDAR sensor, a RADAR sensor, and a photodiode sensor.

A second sensor 140 may include an illuminance sensor. The illuminance sensor is a component for measuring ambient brightness and/or color temperature. For example, the illumination sensor may be implemented so that its resistance value changes depending on the illuminance. For example, the illuminance sensor may be implemented so that when the surroundings are bright, the resistance value of the illuminance sensor decreases and when the surroundings are dark, the resistance of the illuminance sensor increases, thereby measuring the surrounding brightness.

In addition, the electronic apparatus 100 may include various types of sensors such as an image sensor, a touch sensor, a proximity sensor, an acceleration sensor, a geomagnetic sensor, a gyro sensor, a pressure sensor, and a position sensor.

One or more processors 150 may include various processing circuitry and control the overall operation of the electronic apparatus 100. Specifically, one or more processors 150 may be connected to each component of the electronic apparatus 100 and generally control the operation of the electronic apparatus 100. For example, one or more processors 150 may be operatively connected to the display 130 and the memory 120. The processor 150 may include one or more processors.

One or more processors 150 may perform the operation of the electronic apparatus 100 according to various embodiments by executing at least one instruction stored in the memory 120.

One or more processors 150 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. One or more processors 150 may control one or any combination of other components of the electronic apparatus and may perform operations related to communication or data processing. One or more processors 150 may execute one or more programs or instructions stored in the memory. For example, one or more processors may perform the method according to various embodiments of the present disclosure by executing one or more instructions stored in the memory 120.

When the method according to various embodiments of the present disclosure includes a plurality of operations, the plurality of operations may be performed by one processor or by a plurality of processors. For example, when a first operation, a second operation, and a third operation are performed by the method according to various embodiments, the first operation, the second operation, and the third operation may all be performed by a first processor, the first operation and the second operation may be performed by the first processor (e.g., a general-purpose processor), and the third operation may be performed by a second processor (e.g., an artificial intelligence-specific processor).

The one or more processors 150 may be implemented as a single core processor including one core, or one or more multicore processors including a plurality of cores (e.g., homogeneous multicore or heterogeneous multicore). When one or more processors 150 are implemented as a multicore processor, each of the plurality of cores included in the multicore processor may include an internal memory of the processor such as a cache memory and an on-chip memory, and a common cache shared by a plurality of cores may be included in a multicore processor. In addition, each of the plurality of cores (or some of the plurality of cores) included in the multi-core processor may read and perform program instructions for independently implementing the method according to various embodiments of the present disclosure, and all (or part) of the plurality of cores may be linked to read and perform program instructions for implementing the method according to various embodiments of the present disclosure.

When the method according to various embodiments of the present disclosure includes a plurality of operations, the plurality of operations may be performed by one of a plurality of cores included in a multicore processor, or may be performed by the plurality of cores. For example, when the first operation, the second operation, and the third operation are performed by the method according to various embodiments, the first operation, the second operation, and the third operation may all be performed by the first processor in the multicore processor, the first operation and the second operation may be performed by a first core included in the multicore processor, and the third operation may be performed by a second core included in the multicore processor.

In an embodiment of the present disclosure, the processor may be a system-on-chip (SoC) in which one or more processors and other electronic components are integrated, a single-core processor, a multi-core processor, or a core included in the single-core processor or the multi-core processor. The core may be implemented as CPU, GPU, APU, MIC, DSP, NPU, a hardware accelerator, a machine learning accelerator, or the like, but embodiments of the present disclosure are not limited thereto. Hereinafter, for convenience of description, one or more processors 150 will be referred to as the processor 150. In other words, the processor 150 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the processor 150 may acquire the projection distance information to the projection surface based on the sensing data acquired through the first sensor 130. According to an example, the projection distance information may include the projection distance information for each of the plurality of regions included in the projection surface. For example, a plurality of regions may be divided into regions that can be detected by the first sensor 130. For example, when the first sensor 130 is implemented as the ToF sensor, a plurality of regions may be identified as a plurality of regions where a plurality of lights emitted by the ToF sensor are reflected.

According to an embodiment, the processor 150 may acquire the illuminance information based on the sensing data acquired through the second sensor 130. According to an example, the illuminance information may include at least one of brightness information and color temperature information. The brightness information may represent the brightness of surrounding illumination caused by a light source. For example, the brightness information may represent the brightness of light on a surface when an area of 1 $m^2$ is uniformly irradiated with light having a luminous flux of 1 lm (lumen). The color temperature information may be information that represents a color of a light source as a number using absolute temperature. For example, a red light source has a lower color temperature, and a blue light source has a higher color temperature. The temperature may traditionally be measured in Kelvin (K) that is an absolute temperature unit.

According to an embodiment, the processor 150 may acquire gain information for each region included in the projection surface based on the projection distance information and the illuminance information.

According to an example, the processor 150 may acquire local gain information for each region based on the projection distances for each region of the projection surface. For example, the processor 150 may analyze changes in image quality information depending on the projection distance for each of a plurality of regions included in the projection surface to acquire the local gain information for each region. For example, the local gain information for each region may include a gain map in the form of a gray image whose gain value increases as the projection distance corresponding to each of the plurality of regions increases. However, it is not limited thereto, and the local gain information for each region may be implemented in the form of the gain map including gain values such as % information and ratio information between 0 and 1.

According to an example, the processor 150 may acquire the global gain information corresponding to the entire region of the projection surface based on the illuminance information. For example, the processor 150 may acquire the global gain information corresponding to the entire region of the projection surface based on the change in image quality information according to at least one of the brightness information and the color temperature information. For example, the global gain information may include the gain map in the form of the gray image whose gain value increases as the brightness included in the illuminance information increases. For example, the gain map may include the gain values for each pixel block. In the disclosure, a "pixel block" may refer, for example, to one pixel or a set of adjacent pixels including at least one pixel, and a "region" may refer, for example, to a portion of video and may refer to at least one pixel block or a set of pixel blocks. Hereinafter, for convenience of description, the pixel block will be referred to as "pixel."

According to an example, the processor 150 may acquire the gain information for each region based on the local gain information for each region acquired based on the projection distance information and the global gain information acquired based on the illuminance information.

According to an embodiment, the processor 150 may correct the gain information for each region based on the correlation information between the projection distance information and the image quality information and the correlation information between the illuminance information and the image quality information. According to an example, the image quality information may include at least one of contrast information, color information, and sharpness information.

According to an embodiment, the processor 150 may correct the input video based on the corrected gain information for each region to acquire the output video, and control the video projector 110 to project the output video onto the projection surface.

According to an embodiment, the processor 150 may correct the gain information for each region based on the correlation information between the projection distance information and the contrast information and the correlation information between the illuminance information and the contrast information to acquire first gain information corresponding to the contrast information. For example, the first gain information may be in the form of the gain map corresponding to the contrast information.

According to an embodiment, the processor 150 may correct the gain information for each region based on the correlation information between the projection distance information and the color information and the correlation information between the illuminance information and the color information to acquire second gain information corresponding to the color information. For example, the first gain information may be in the form of the gain map corresponding to the color information.

According to an embodiment, the processor 150 may correct the gain information for each region based on the correlation information between the projection distance information and the sharpness information and the correlation information between the illuminance information and the sharpness information to acquire third gain information corresponding to the sharpness information. For example, the third gain information may be in the form of the gain map corresponding to the sharpness information.

According to an embodiment, the processor 150 may correct the input video based on first gain information, the second gain information, and the third gain information to acquire the output video.

According to an embodiment, the processor 150 may analyze the input video to acquire the video characteristic information, and correct the input video based on the video characteristic information, the first gain information, the second gain information, and the third gain information to acquire the input video. According to an example, the video characteristic information may include at least one of luminance histogram information, color histogram information, and contour information. For example, the luminance histogram information may include a graph in a rectangular shape in which luminance values are displayed on a horizontal axis and the number of pixels corresponding to each luminance value is displayed on a vertical axis. For example, the color histogram information may include a graph in a rectangular shape in which color values are displayed on a horizontal axis and the number of pixels corresponding to each color value is displayed on a vertical axis. For example, the contour (contour) information may include a contour map image that represents a distribution of contours in a video in map form. For example, the contour map image may include at least one of position information (or coordinate information), magnitude information, or direction information for pixels detected as contours (or boundaries). In the disclosure, the contour may be distinguished from a complex edge with various directions in that it refers to an edge with clear and straight directivity, and/or an edge with clear directivity and a thickness greater than or equal to a threshold value. For example, the processor 150 may apply a predetermined filter to the input video to acquire the contour map image. For example, a filter may include, but is not limited thereto, at least one of a Laplacian filter that is a second-order differential filter, a Roberts filter, a Sobel filter, a directional filter, a gradient filter, a difference filter, and a Prewitte filter. Applying a filter to the input video may refer to convoluting the filter to the input video. The convolution may refer, for example, to a video processing technique using a filter with weights, and refers to a technique of multiplying the pixel values of the input video by the corresponding weights (or coefficients) included in the filter, respectively, and then acquiring the sum. Here, the filter is also called a mask, a window, or a kernel.

According to an embodiment, the processor 150 may correct contrast information for each region based on the luminance histogram information and the first gain information. According to an example, the processor 150 may correct at least one of brightness information and contrast information for each region based on the luminance histogram information and the first gain information. For example, the processor 150 may identify maximum luminance information of the input video based on the luminance histogram information and adjust a contrast gain for contrast information correction based on the identified maximum luminance information.

According to an embodiment, the processor 150 may correct color information for each region based on the color histogram information and the second gain information. According to an example, the processor 150 may correct at least one of saturation information and color temperature information for each region based on the color histogram information and the second gain information. For example, the processor 150 may identify maximum RGB information of the input video based on the color histogram information and adjust a saturation gain for saturation information correction based on the identified RGB information.

According to an embodiment, the processor 150 may correct sharpness information for each region based on the contour information and third gain information. For example, the processor 150 may identify the amount information and magnitude information of the contour included in the input video based on the contour information, and adjust the gain for the sharpness correction based on the amount information and magnitude information of the identified amount information.

According to an embodiment, the processor 150 may adjust the gain information so that the gain information for each region increases from a center region of the projection surface to an edge region based on at least one of the projection distance information or the size information of the projection surface.

According to an embodiment, the processor 150 may identify the region of interest within the input video, and correct the region of interest based on the corrected gain information for each region to acquire the output video.

Figure 2B:
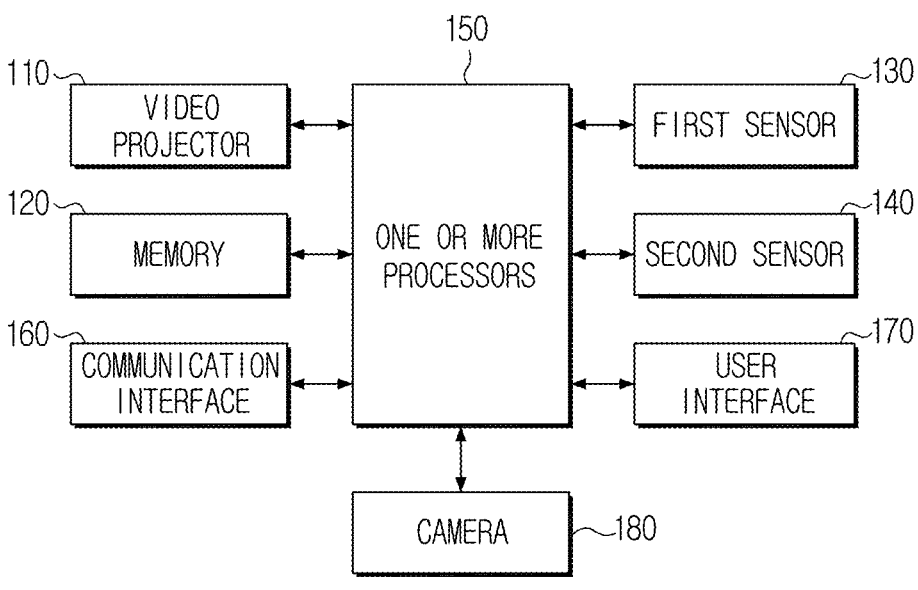
FIG. 2B is a block diagram illustrating an example configuration of an electronic apparatus according to various embodiments.

FIG. 2B is a block diagram illustrating an example configuration of an electronic apparatus according to various embodiments.

According to FIG. 2B, the electronic apparatus 100' includes the video projector 110, the memory 120, the first sensor 130, the second sensor 140, one or more processors (e.g., including processing circuitry) 150, a communication interface (e.g., including communication circuitry) 160, a user interface (e.g., including circuitry) 170, and a camera 180. A detailed description for components overlapped with components illustrated in FIG. 2A among components illustrated in FIG. 2B may not be repeated here.

The communication interface 160 may include various communication circuitry and may perform communication with an external device (server or user terminal). For example, the processor 150 may receive various data or information from an external device connected through the communication interface 160, and may transmit various data or information to the external device.

The communication interface 160 may include at least one of a WiFi module, a Bluetooth module, a wireless communication module, an NFC module, and an ultra-wide band (UWB) module. In addition, the wireless communication module may perform communication depending on various communication protocols such as Institute of Electrical and Electronics Engineers (IEEE), Zigbee, 3rd generation (3G), 3rd generation partnership project (3GPP), long term evolution (LTE), and 5th generation (5G).

In addition, the communication interface 160 may perform communications according to communication methods such as Ethernet, IEEE 1394, a high-definition multimedia interface (HDMI), a universal serial bus (USB), a mobile high-definition link (MHL), audio engineering society/European broadcasting union (AES/EBU), optical, and coaxial according to the implementation example of the electronic apparatus 100'.

The user interface 170 may include various circuitry and be implemented by a device such as a button, a touch pad, a mouse, and a keyboard or may be implemented by a touch projection surface, a remote control transceiver, or the like, capable of performing both of the display function described above and a manipulation input function. The remote control transceiver may receive a remote control signal from an external remote control device or transmit a remote control signal to the external remote control device through at least one of infrared communication, Bluetooth communication, or Wi-Fi communication.

The camera 180 may be turned on and perform photography according to a preset event. The camera 180 may convert the captured video into an electrical signal and generate video data based on the converted signal. For example, a subject is transformed into an electrical image signal through a semiconductor optical device (charge coupled device (CCD)), and the transformed image signal may be amplified and transformed into a digital signal and then processed.

In addition, the electronic apparatus 100' may include a microphone, etc. according to the implementation example. The microphone is a component for receiving a user speech or other sounds and converting the user speech or other sounds into audio data. However, according to an embodiment, the electronic apparatus 100' may receive a user's voice input through an external device through the communication interface 160.

FIG. 3 is a flowchart illustrating an example method of controlling an electronic apparatus according to various embodiments.

Referring to FIG. 3, in operation 310, the electronic apparatus 100 may acquire the projection distance information to the projection surface. According to an example, the electronic apparatus 100 may acquire the projection distance information to the projection surface based on the sensing data acquired through the first sensor 130. For example, the projection distance information may include the projection distance information for each of the plurality of regions included in the projection surface.

In operation 320, the electronic apparatus 100 may acquire the illuminance information. According to an embodiment, the electronic apparatus 100 may acquire the illuminance information based on the sensing data acquired through the second sensor 130. For example, the illuminance information may include at least one of the brightness information and the color temperature information.

In operation 330, the electronic apparatus 100 may acquire the gain information for each region included in the projection surface based on the projection distance information and the illuminance information. According to an example, the processor 150 may acquire the local gain information for each region based on the projection distances for each region of the projection surface, and acquire the global gain information corresponding to the entire region of the projection surface based on illuminance information. According to an example, the processor 150 may acquire the gain information for each region based on the local gain information for each region acquired based on the projection distance information and the global gain information acquired based on the illuminance information.

In operation S340, the electronic apparatus 100 may correct the gain information for each region based on the correlation information between the projection distance information and the image quality information and the correlation information between the illuminance information and the image quality information. According to an example, the image quality information may include at least one of contrast information, color information, and sharpness information.

In operation 350, the electronic apparatus 100 may acquire the output video by correcting the input video based on the corrected gain information for each region.

In operation 360, the electronic apparatus 100 may project the output video onto the projection surface.

In FIG. 3, the order of all steps is mapped for convenience of description, but of course, the order of steps that are unrelated to the order or can be performed in parallel is not necessarily limited to that order.

Figure 4:
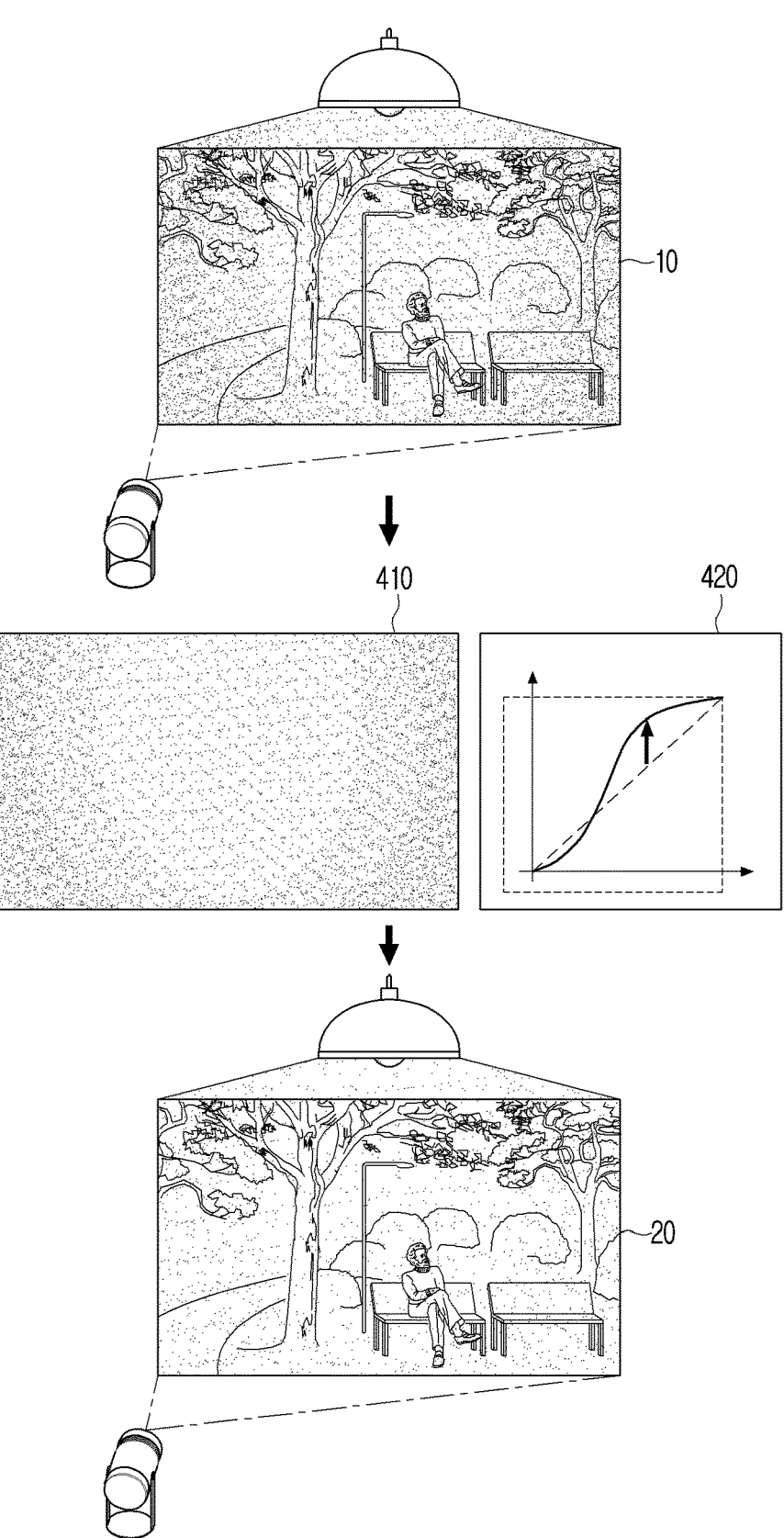
FIG. 4 is a diagram illustrating an example video signal correction method according to various embodiments.

FIG. 4 is a diagram illustrating an example video signal correction method according to various embodiments.

Referring to FIG. 4, when the input video 10 is projected onto the projection surface as it is, the visibility of the projection screen may decrease depending on the surrounding lighting and the projection distance of the projector. Accordingly, as illustrated in FIG. 3, a video signal 420 of the input video 10 may be corrected based on gain map information 410 for each region acquired by analyzing the image quality influence for each region of the projection screen to acquire the output video 20, and the acquired output video 20 is projected onto the projection surface to improve the visibility of the projection screen.

Hereinafter, the video signal correction method will be described in greater detail.

Figure 5:
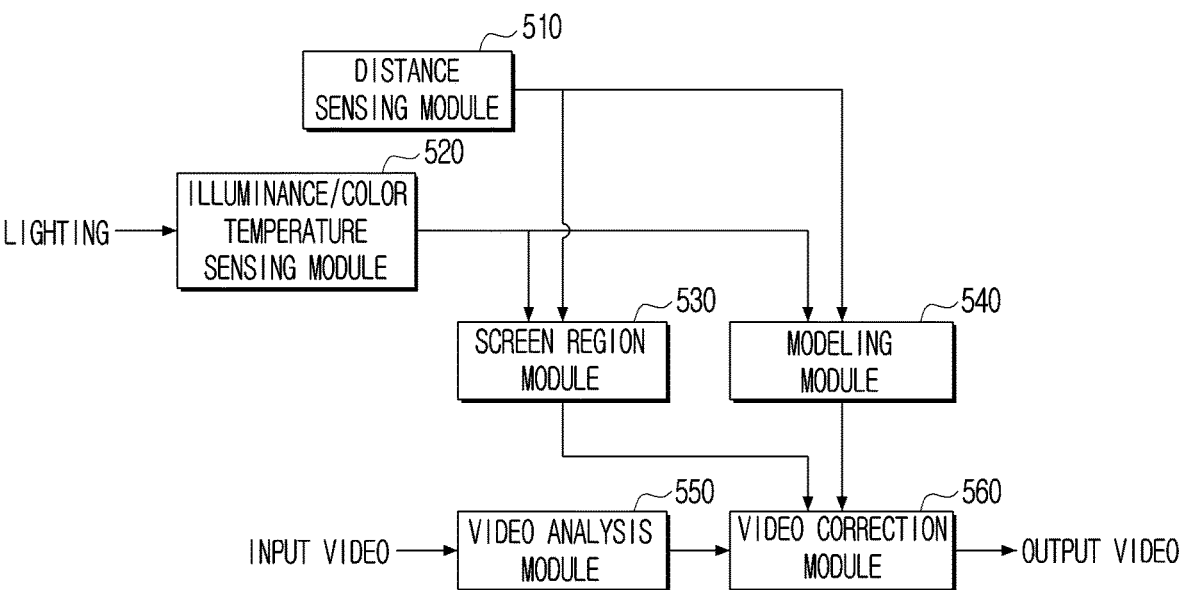
FIG. 5 is a diagram illustrating an example video signal correction method according to various embodiments.

FIG. 5 is a diagram illustrating an example video signal correction method according to various embodiments.

As illustrated in FIG. 5, the processor 150 may acquire an output video using a distance sensing module (e.g., including various circuitry and/or executable program instructions) 510, an illuminance/color temperature sensing module (e.g., including various circuitry and/or executable program instructions) 520, a screen region calculation module (e.g., including various circuitry and/or executable program instructions) 530, a modeling module (e.g., including various circuitry and/or executable program instructions) 540, a video analysis module (e.g., including various circuitry and/or executable program instructions) 550, and a video correction module (e.g., including various circuitry and/or executable program instructions) 560. Each module may be implemented with at least one software, at least one hardware, and/or a combination thereof.

For example, at least one of the distance sensing module 510, the illuminance/color temperature sensing module 520, the screen region calculation module 530, the modeling module 540, the video analysis module 550, and the video correction module 560 may be implemented to use a predefined algorithm, a predefined formula, and/or a trained artificial intelligence model. The distance sensing module 510, the illuminance/color temperature sensing module 520, the screen region calculation module 530, the modeling module 540, the video analysis module 550, and the video correction module 560 may be included in the electronic apparatus 100, but may be distributed to at least one external device according to an example.

According to an example, the processor 150 may acquire the projection distance information to the projection surface using the distance sensing module 510. According to an example, the projection distance information may include the projection distance information for each of the plurality of regions included in the projection surface.

For example, the distance sensing module 510 may use the first sensor 120 to measure the projection distance between the electronic apparatus 100 and the projection surfaces for each region of the projection surface (for example, for each region in units of 5×4 or 50×40). For example, when the first sensor 120 is implemented as the ToF sensor, the plurality of regions may be identified as a plurality of regions where a plurality of lights emitted by the ToF sensor are reflected, and the projection distances for each region may be measured depending on a depth value of the ToF sensor.

According to an example, the processor 150 may acquire the illuminance information using the illuminance/color temperature sensing module 520. According to an example, the illuminance information may include at least one of brightness information and color temperature information.

For example, the illuminance/color temperature sensing module 520 may use the second sensor 130 to measure the illuminance brightness and color temperature of the surrounding environment as continuous values or measure the illuminance brightness and color temperature separately by section.

According to an example, the processor 150 may acquire the gain information for each region using the screen region calculation module 530.

According to an example, the screen region calculation module 530 may acquire the gain map by analyzing the image quality change information of the projection surfaces for each region depending on the illumination brightness/ color temperature and the projection distance. For example, the screen region calculation module 530 may acquire the gain map in the form of a gray image including the gain values for each pixel. For example, the gray value may be a bitmap with values from 0 to 255 in the case of an 8-bit image, but is not limited thereto. For example, the gain map may include the gain map in the form of the gray image in which the gain value depending on the projection distance increases as the projection distance corresponding to each region increases, and the gain value increases as the illuminance brightness increases. This is because as the projection distance increases and the illuminance brightness increases, the image quality may decrease and the visibility may decrease.

Figure 6A:
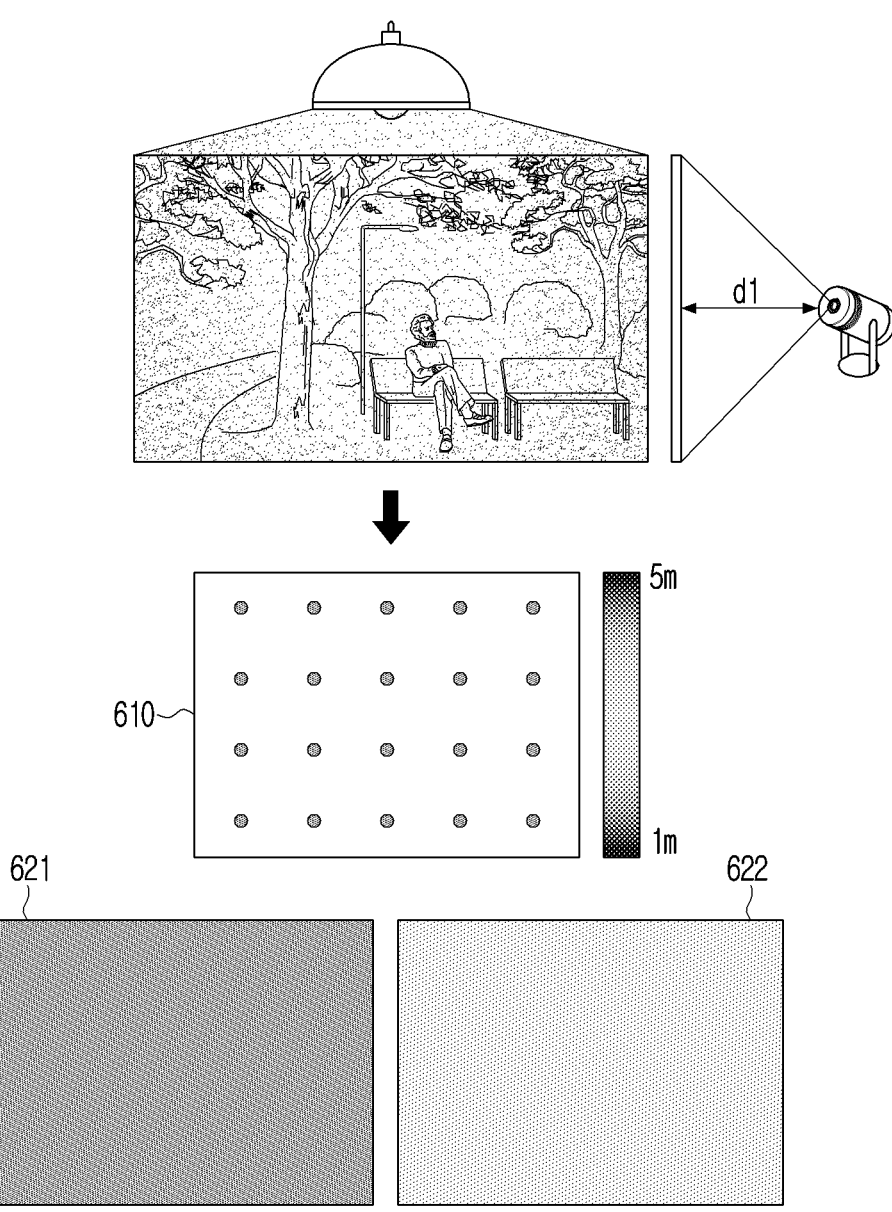
FIGS. 6A and 6B are diagrams illustrating an example method of acquiring gain information for each region according to various embodiments.
Figure 6B:
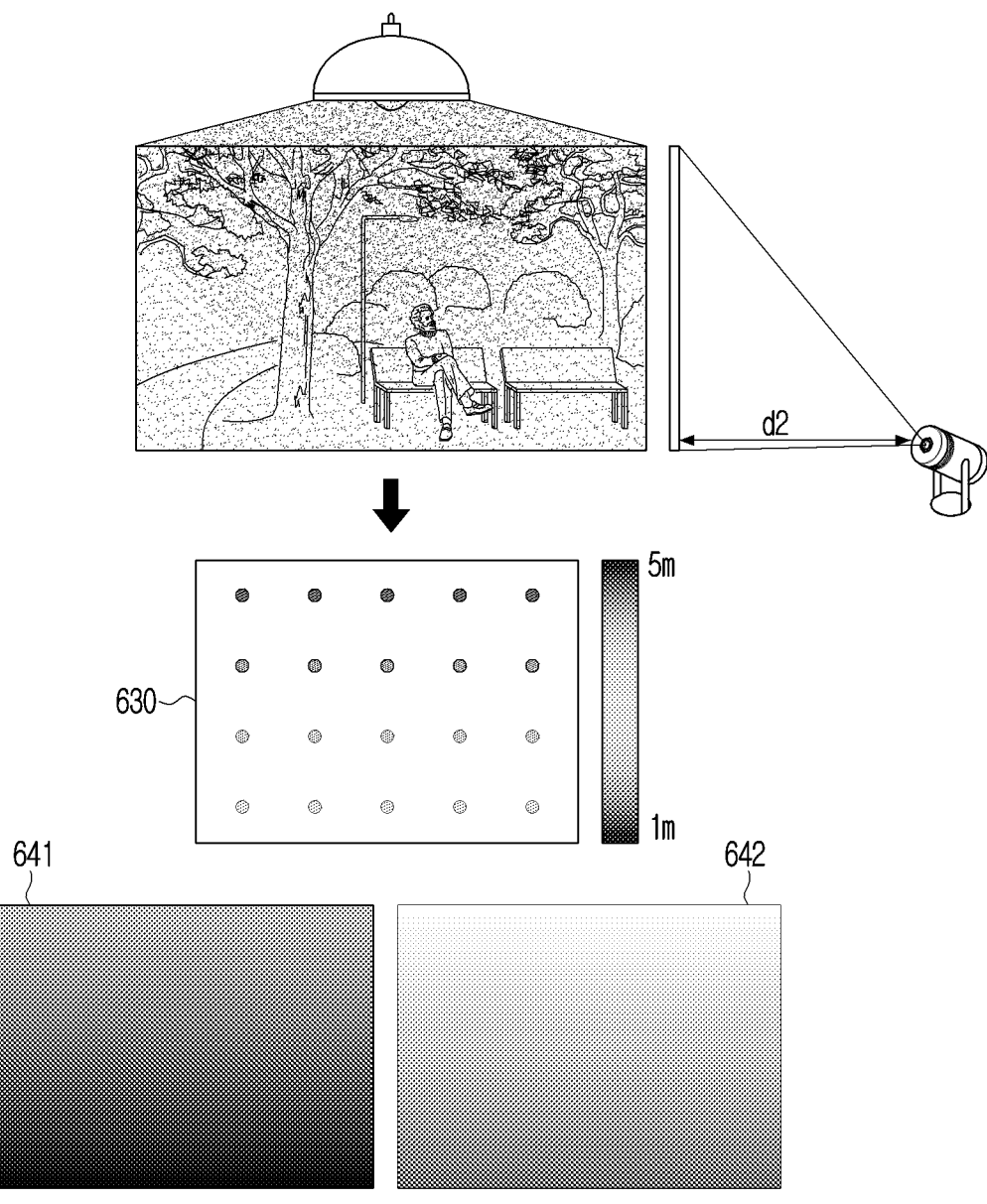

FIGS. 6A and 6B are diagrams illustrating an example method of acquiring gain information for each region according to various embodiments.

FIG. 6A is a diagram illustrating an example gain map acquired in a viewing environment in which illuminance brightness is A lux and B lux (e.g., 50 lux and 100 lux), color temperature is C K (e.g., 3000 K), and projection distance is d1 (e.g., 2 m).

For example, first sensor data 610 is data acquired through the ToF sensor, and the depth values for each region may indicate the projection distance.

For example, a first gain map 621 may be a gain map measured at an illuminance brightness of 50 lux, a color temperature of 3000 K, and a projection distance of 2 m.

For example, a second gain map 622 may be a gain map measured at an illuminance brightness of 100 lux, a color temperature of 3000 K, and a projection distance d1 of 2 m.

For example, referring to FIG. 6A, since it is projected frontally at a distance of 2 m and the projection distances for each region is the same, the first gain map 621 and the second gain map 622 may be gain maps including the same gain values for each region.

FIG. 6B is a diagram illustrating an example gain map acquired in a viewing environment in which illuminance brightness is A lux and B lux (e.g., 50 lux and 100 lux), color temperature is D K (e.g., 5,000 K), and projection distance is d2 (e.g., 4 m). For example, since it is projected from bottom to top at a distance of 4 m and the projection distances for each region are different, the gain according to the projection distance may be different local gains for each region.

For example, second sensor data 630 is data acquired through the ToF sensor, and the depth values for each region may indicate the projection distance.

For example, a first gain map 641 may be a gain map measured at an illuminance brightness of 50 lux, a color temperature of 3000 K, and a projection distance d2 of 4 m.

For example, a second gain map 642 may be a gain map measured at an illuminance brightness of 100 lux, a color temperature of 3000 K, and a projection distance of 4 m.

For example, referring to FIG. 6B, since it is projected from bottom to top at a distance of 4 m and the projection distances for each region are different, the third gain map 641 and the second gain map 642 may be gain maps including different gain values for each region.

FIG. 7 is a flowchart illustrating an example method of correcting gain information for each region according to various embodiments.

According to an embodiment, the electronic apparatus 100 may correct the gain information for each region according to the correlation using the modeling module 540.

Referring to FIG. 7, in operation 710, the electronic apparatus 100 may correct the gain information for each region based on the correlation information between the projection distance information and the contrast information and the correlation information between the illuminance information and the contrast information to acquire first gain information corresponding to the contrast information. For example, the first gain information may be in the form of the gain map corresponding to the contrast information.

In operation 720, the electronic apparatus 100 may correct the gain information for each region based on the correlation information between the projection distance information and the color information and the correlation information between the illuminance information and the color information to acquire second gain information corresponding to the color information. For example, the second gain information may be in the form of the gain map corresponding to the color information.

In operation 730, the electronic apparatus 100 may correct the gain information for each region based on the correlation information between the projection distance information and the sharpness information and the correlation information between the illuminance information and the sharpness information to acquire third gain information corresponding to the sharpness information. For example, the third gain information may be in the form of the gain map corresponding to the sharpness information.

In operation 740, the electronic apparatus 100 may correct the input video based on first gain information, the second gain information, and the third gain information to acquire the output video.

In FIG. 7, the order of all steps is mapped for convenience of description, but of course, the order of steps that are unrelated to the order or can be performed in parallel is not necessarily limited to that order.

FIGS. 8A and 8B include graphs and a table illustrating an example method of correcting gain information for each region of a modeling module 540 according to various embodiments.

According to an embodiment, each video characteristic information may have a correlation with each viewing environment information as illustrated in FIG. 8A. For example, the viewing environment information may include the projection distance, the illuminance brightness, and the color temperature information. For example, the video characteristic information may include the contrast information, the color information, and the sharpness information.

According to an example, the modeling module 540 may derive a video correction function using a correlation model between the illuminance, the color temperature, and the projection distance that affects visibility and the video characteristic information (e.g., contrast, color, sharpness), and calculate the amount of video signal correction.

For example, the graphs illustrated in FIG. 8A may be a correlation model representing the correlation between each video characteristic information and the viewing environment information. The correlation model may be acquired based on experimental data through prior experiments.

For example, the correlation model may be acquired based on proportional coefficients corresponding to each correlation calculated based on the experimental data, as in the table illustrated in FIG. 8B. For example, as the illuminance brightness/projection distance increases, the contrast ratio decreases, so the compensation gain may increase.

According to an example, the modeling module 540 may calculate a gain value for image quality correction using the acquired correlation model.

For example, the modeling module 540 may derive functional expressions for an illuminance, a color temperature, a projection distance, a contrast gain, a saturation gain, a sharpness gain, and a white balance gain. For example, in the case of the saturation, the functional expression for calculating the gain value for the image quality correction may be acquired using the saturation component in a hue saturation value (HSV) color space as follows. The HSV color space refers to a method of specifying a specific color using the coordinates of hue, saturation, and value.

Contrast Gain=f1 (illuminance, projection distance)

Saturation Gain=f2 (illuminance, projection distance)

Sharpness Gain=f3 (illuminance, projection distance)

White Balance Gain=f4 (color temperature)

FIG. 9 is a flowchart illustrating an example video correction method based on gain information and video characteristics for each region according to various embodiments.

Referring to FIG. 9, in operation 910, the electronic apparatus 100 may analyze the input video to acquire at least one of the luminance histogram information, the color histogram information, and the contour information.

In operation 920, the electronic apparatus 100 may correct the contrast information for each region based on the luminance histogram information and the gain information for each region corresponding to the contrast information.

In operation 930, the electronic apparatus 100 may correct the color information for each region based on the color histogram information and the gain information for each region corresponding to the color information.

In operation 940, the electronic apparatus 100 may correct the sharpness information for each region based on the contour information and the gain information for each region corresponding to the sharpness information.

In operation 950, the electronic apparatus 100 may acquire the output video based on the contrast information, the color information, and the sharpness information for each corrected region.

In FIG. 9, the order of all steps is mapped for convenience of description, but of course, the order of steps that are unrelated to the order or can be performed in parallel is not necessarily limited to that order.

FIG. 10 is a diagram illustrating an example video analysis method of a video analysis module 550 according to various embodiments.

Referring to FIG. 10, the video analysis module 550 may analyze the input video 10 to acquire the video characteristic information. For example, the video characteristic information may include at least one of the luminance histogram information, the color histogram information, and the contour distribution information. For example, the luminance histogram information may include a graph in a rectangular shape in which luminance values are displayed on a horizontal axis and the number of pixels corresponding to each luminance value is displayed on a vertical axis. For example, the color histogram information may include a graph in a rectangular shape in which color values are displayed on a horizontal axis and the number of pixels corresponding to each color value is displayed on a vertical axis. For example, the contour (contour) information may include a contour map image that represents a distribution of contours in a video in map form.

According to an example, the video analysis module 550 may adjust the gain correction amount for each region based on the video characteristic information of the input video for precise video correction.

For example, the video analysis module 550 may adjust the contrast gain depending on the maximum luminance value of the video acquired based on the luminance histogram information. For example, as the maximum luminance value decreases, the gain adjustment range may increase.

For example, the video analysis module 550 may adjust the saturation gain depending on the maximum R/G/B value of the video acquired based on the color histogram information. For example, as the maximum R/G/B value decreases, the gain adjustment range may increase. For example, the video analysis module 550 may adjust the saturation gain using the saturation component in the HSV color space.

For example, the video analysis module 550 may adjust the sharpness gain depending on the amount and magnitude of the contour included in the contour distribution information. For example, as the magnitudes of the contours for each pixel increases, the gain value may increase. For example, the video analysis module 550 may convert the RGB values into YUV and then adjust the sharpness gain using a Y phase difference. The YUV is a component signal that comprises a video signal with luminance and chrominance signals.

Figure 11:
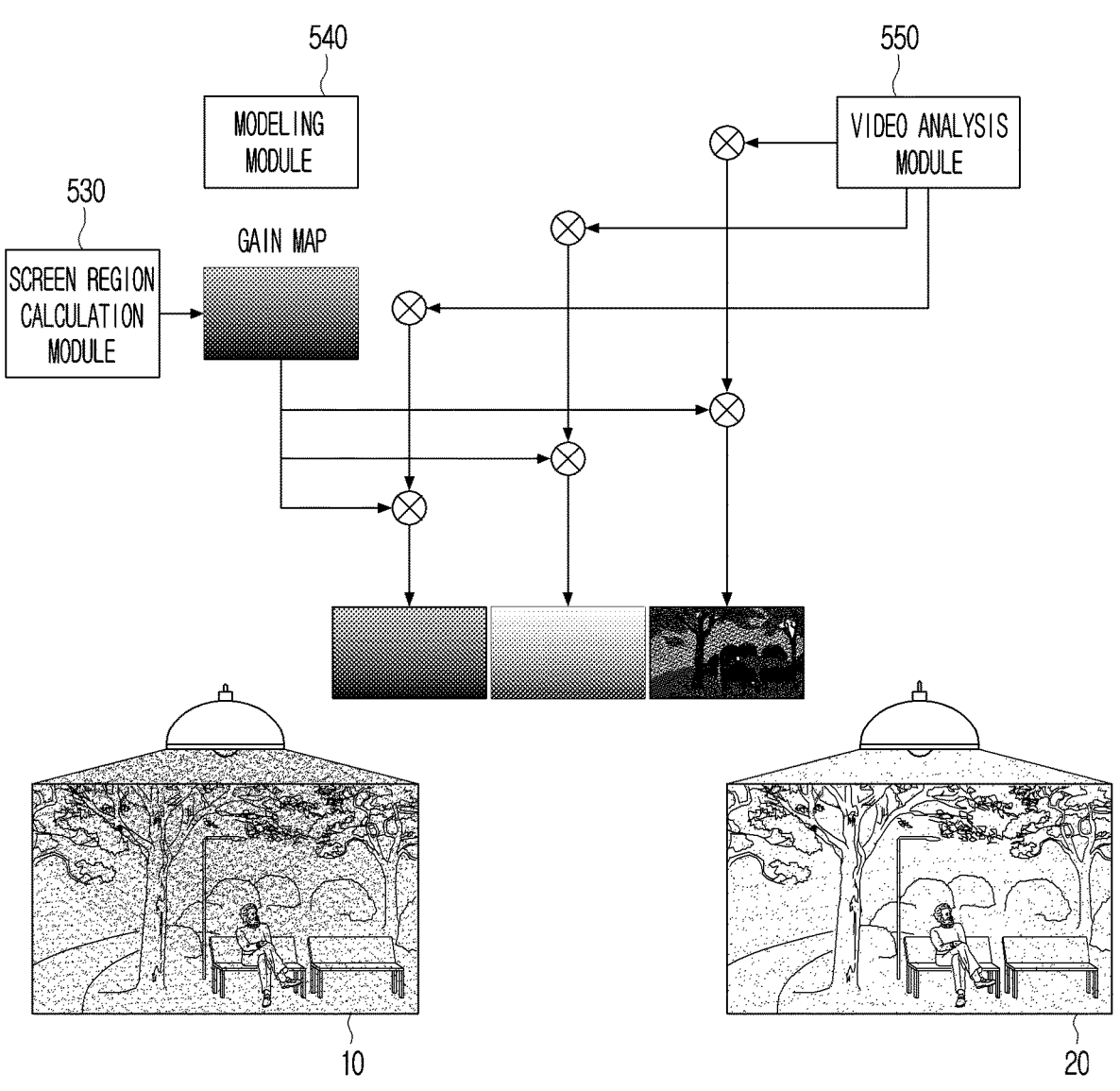
FIG. 11 is a diagram illustrating an example video analysis method of a video analysis module according to various embodiments.

FIG. 11 is a diagram illustrating an example video analysis method of a video correction module 560 according to various embodiments.

According to an embodiment, the video correction module 560 may combine the gain information acquired by the screen region calculation module 530, the modeling module 540 and video analysis module 550, and perform the correction processing on the contrast, color, and sharpness of the input video 10 based on the combined gain information to acquire the output video 20.

According to an example, when the gain information for each region acquired by the screen region calculation module 530 is corrected by the modeling module 540, the video signal of the input video 10 may be corrected based on the gain information for each region corrected by the modeling module 540 and the video characteristic information acquired by the video analysis module 550.

For example, the video correction module 560 may correct the contrast information for each region of the input video signal based on the luminance histogram information and the first gain information. For example, the video correction module 560 multiplies the gain map acquired by the screen region calculation module 530 and the contrast gain acquired by the modeling module 540 to acquire the contrast gain map, and perform the correction processing on the contrast for each region based on the contrast gain map. Here, the contrast gain may have the gain range adjusted by the video analysis module 550.

For example, the video correction module 560 may correct the color information for each region of the input video signal based on the color histogram information and the second gain information. For example, the video correction module 560 may multiply the gain map acquired by the screen region calculation module 530 and the saturation gain acquired by the modeling module 540 to acquire the color gain map, and perform the correction processing on the color for each region based on the color gain map. Here, the saturation gain may have the gain range adjusted by the video analysis module 550. For example, the video correction module 560 may apply the same method to the white balance gain.

For example, the video correction module 560 may correct the sharpness information for each region of the input video signal based on the contour information and the third gain information. For example, the video correction module 560 multiplies the gain map acquired by the screen region calculation module 530 and the sharpness gain acquired by the modeling module 540 to acquire the sharpness gain map, and perform the correction processing on the sharpness for each region based on the sharpness gain map. Here, the sharpness gain may have the gain range adjusted by the video analysis module 550.

Figure 12:
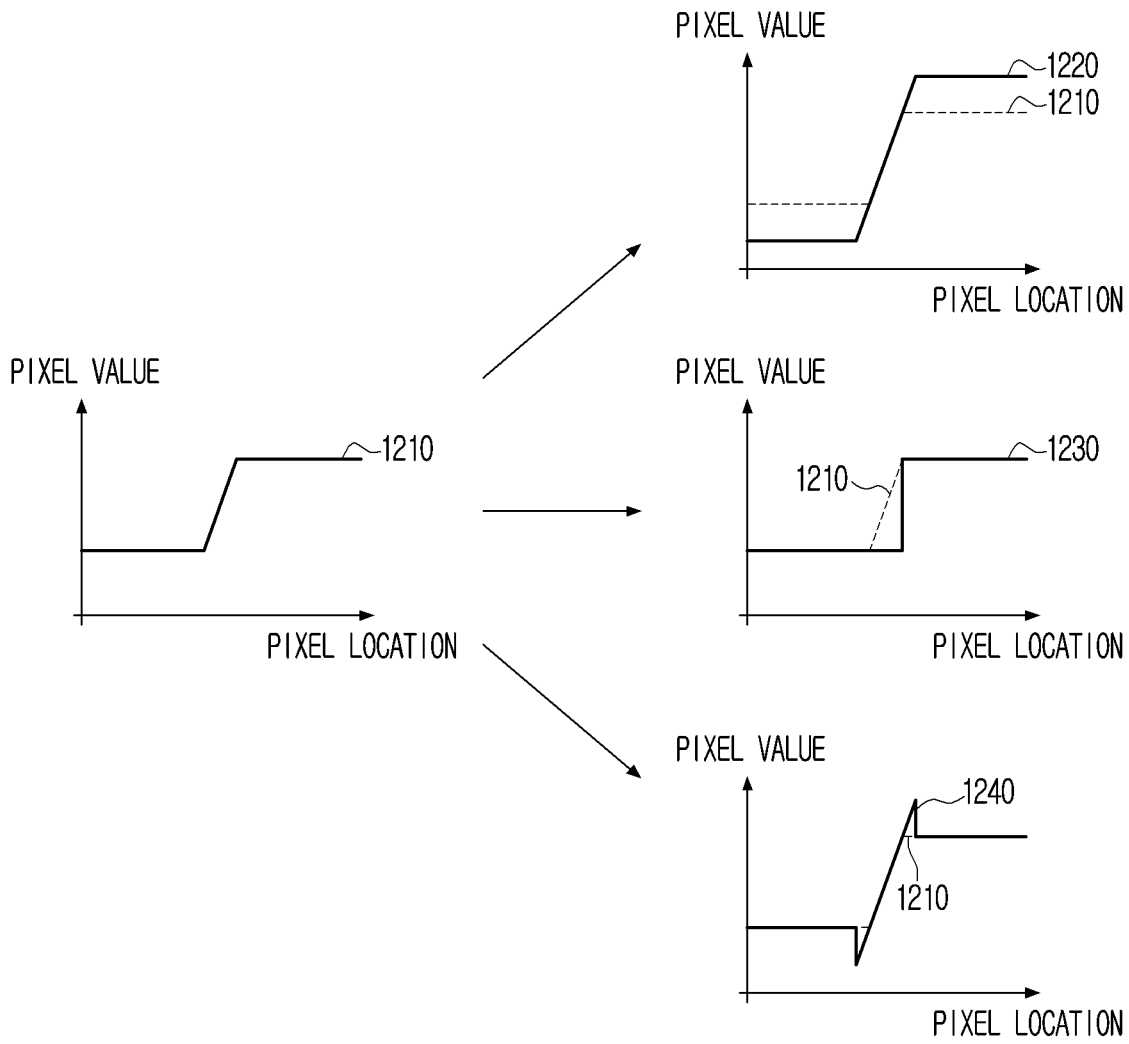
FIG. 12 includes graphs illustrating an example sharpness correction processing method according to various embodiments.

FIG. 12 includes graphs illustrating an example sharpness correction processing method according to various embodiments.

Referring to FIG. 12, the sharpness of the contour area may be corrected by processing a pixel value 1210 in the contour area using at least one of a first method 1220, a second method 1230, and a third method 1240.

Figure 13:
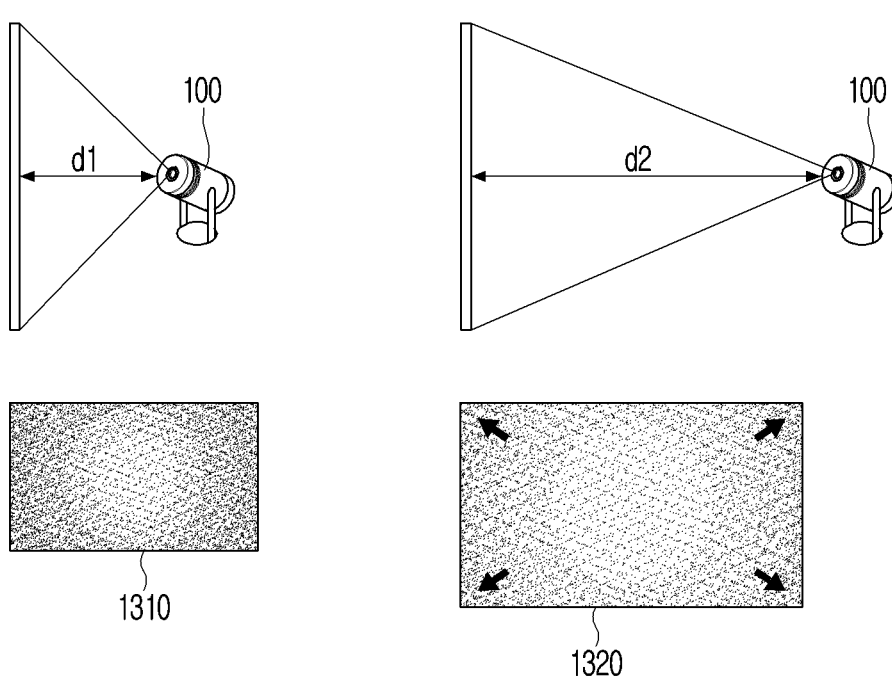
FIG. 13 is a diagram illustrating an example method of compensating for a brightness difference according to a projection distance according to various embodiments.

FIG. 13 is a diagram illustrating an example method of compensating for a brightness difference according to a projection distance according to various embodiments.

According to an embodiment, the electronic apparatus 100 may adjust the gain information so that the gain information for each region increases from a center region of the projection surface to an edge region based on at least one of the projection distance or the size information of the projection surface.

According to an example, the electronic apparatus 100 may adjust the gain map radially as the projection distances d1 and d2 or the size of the projection surface increases to adjust gain maps 1310 and 1320 so that the gain such as the contrast and/or color of the edge area increases. This is because as the projection distance increases, the screen size increases and the difference in brightness between the center area and the edge area of the screen can be seen relatively more.

Figure 14:
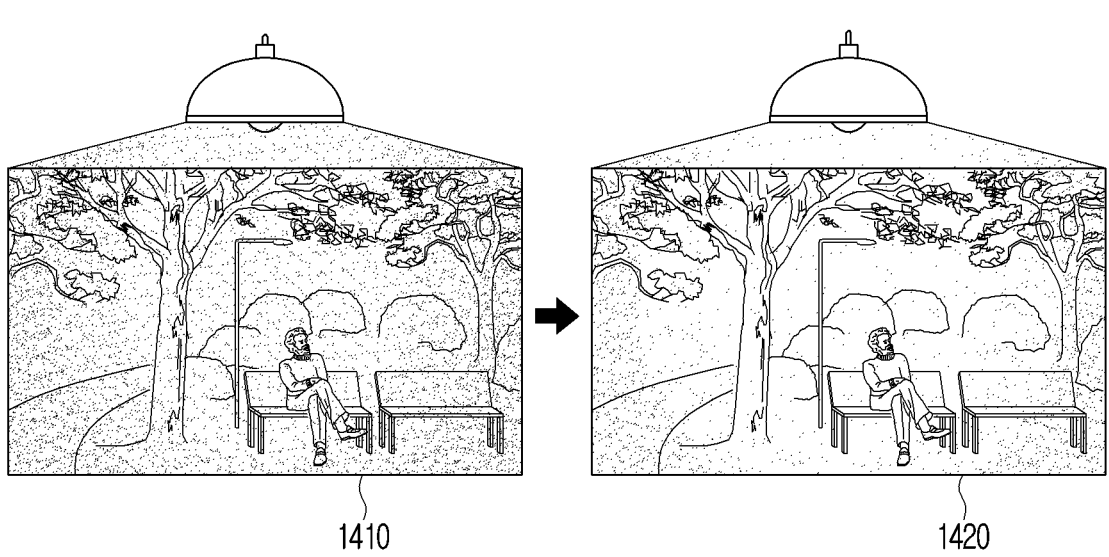
FIG. 14 is a diagram illustrating an example method of compensating for a region of interest according to various embodiments.

FIG. 14 is a diagram illustrating an example method of compensating for a region of interest according to various embodiments.

According to an embodiment, the electronic apparatus 100 may identify the region of interest within the input video, and correct the region of interest based on the corrected gain information for each region to acquire the output video. For example, the region of interest may be determined according to various methods of setting a region of interest based on the arrangement of objects, the type of objects, the number of objects, the size of objects, etc. The region of interest may be set in various shapes, such as square, circular, oval, or irregular shape.

According to an example, the electronic apparatus 100 may apply image quality enhancement to the region of interest, and may perform no processing on the region of non-interest or apply the image quality degradation to the region of non-interest. For example, since the visibility of the electronic apparatus 100 is reduced under bright lighting (1410), to improve the relative visibility in the video, the contrast, color, and sharpness of the region of interest may be improved, and the region of non-interest may be reduced rather (1420). Accordingly, the relative contrast ratio and/or sharpness of the region of interest may be improved due to the out-focus effect of the region of non-interest.

According to various embodiments, the electronic apparatus 100 may input the input video, the corrected gain map, and the video characteristic information into the trained artificial intelligence model to acquire the output video. According to an example, the artificial intelligence model may be trained to acquire the output video by correcting the input video based on the corrected gain map and video characteristic information.

Training the artificial intelligence model may refer, for example, to the predefined operation rule or artificial intelligence model set to perform a desired characteristic (or purpose) being created by training a basic artificial intelligence model (e.g., artificial intelligence model including any random parameters) using a plurality of pieces of training data by a learning algorithm. Such training may be performed through a separate server and/or system, but is not limited thereto and may be performed in the cooking device. Examples of the training algorithm include supervised training, unsupervised training, semi-supervised training, or reinforcement training, but are not limited thereto.

The artificial intelligence model may be implemented as, for example, a convolutional neural network (CNN), a recurrent neural network (RNN), a restricted Boltzmann machine (RBM), a deep belief network (DBN), a bidirectional recurrent deep neural network (BRDNN), deep Q-networks, or the like, but is not limited thereto.

According to the various embodiments described above, the problem of reduced visibility of the projector screen depending on ambient lighting and projector projection distance may be improved through the video signal correction.

The methods according to various embodiments of the present disclosure described above may be implemented by software upgrade or hardware upgrade of the existing electronic apparatus.

In addition, various embodiments of the present disclosure described above can be performed through an embedded server provided in the electron apparatus or a server outside the electronic apparatus.

According to an embodiment of the disclosure, the diverse embodiments described above may be implemented as software including instructions stored in a machine-readable storage medium (e.g., a computer-readable storage medium). A machine may be an apparatus that invokes the stored instruction from the storage medium and may be operated depending on the invoked instruction, and may include the electronic device (for example, the electronic device A) according to the disclosed embodiments. When a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. The term 'non-transitory' storage medium is tangible without including a signal, and may not distinguish whether data are semi-permanently or temporarily stored in the storage medium.

In addition, according to an embodiment of the disclosure, the methods according to the various embodiments described above may be included and provided in a computer program product. The computer program product may be traded as a product between a seller and a purchaser. The computer program product may be distributed in the form of a storage medium (e.g., a compact disc read only memory (CD-ROM)) that may be read by the machine or online through an application store (e.g., PlayStore™). In a case of the online distribution, at least portions of the computer program product may be at least temporarily stored in a storage medium such as a memory of a server of a manufacturer, a server of an application store, or a relay server or be temporarily created.

In addition, each of components (e.g., modules or programs) according to the diverse embodiments described above may include a single entity or a plurality of entities, and some of the corresponding sub-components described above may be omitted or other sub-components may be further included in the diverse embodiments. Alternatively or additionally, some of the components (e.g., the modules or the programs) may be integrated into one entity, and may perform functions performed by the respective corresponding components before being integrated in the same or similar manner. Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:
1. An electronic apparatus, comprising:
a video projector;
a first sensor;
a second sensor;
a memory configured to store one or more instructions; and at least one processor, comprising processing circuitry, operatively connected to the video projector, the first sensor, the second sensor, and the memory,
wherein at least one processor, individually and/or collectively, is configured to execute the one or more instructions and is configured to:
acquire projection distance information to a projection surface based on sensing data acquired through the first sensor,
acquire illuminance information based on the sensing data acquired through the second sensor,
acquire gain information for each region included in the projection surface at least by analyzing a change in image quality information depending for each region on the projection distance information and the illuminance information,
correct the gain information for each region based on correlation information between the projection distance information and image quality information and correlation information between the illuminance information and the image quality information,
acquire an output video by correcting the input video based on the corrected gain information for each region, and
control the video projector to project the output video onto the projection surface.
2. The electronic apparatus as claimed in claim 1, wherein the image quality information includes at least one of contrast information, color information, and sharpness information, and
at least one processor, individually and/or collectively, is configured to:
acquire first gain information corresponding to the contrast information by correcting the gain information for each region based on correlation information between the projection distance information and the contrast information and correlation information between the illuminance information and the contrast information,
acquire second gain information corresponding to color information by correcting the gain information for each region based on correlation information between the projection distance information and the color information and correlation information between the illuminance information and the color information,
acquire third gain information corresponding to sharpness information by correcting the gain information for each region based on correlation information between the projection distance information and the sharpness information and correlation information between the illuminance information and the sharpness information, and
acquire the output video by correcting the input video based on the first gain information, the second gain information, and the third gain information.
3. The electronic apparatus as claimed in claim 2, wherein at least one processor, individually and/or collectively, is configured to:
analyze the input video to acquire video characteristic information, and
acquire the output video by correcting the input video based on the video characteristic information, the first gain information, the second gain information, and the third gain information.
4. The electronic apparatus as claimed in claim 3, wherein the video characteristic information includes at least one of luminance histogram information, color histogram information, and contour information, and at least one processor, individually and/or collectively, is
configured to: correct the contrast information for each
region based on the luminance histogram information
and the first gain information, correct the color information for each region based on the
color histogram information and the second gain infor-
mation, and correct the sharpness information for each region based
on the contour information and the third gain informa-
tion.

5. The electronic apparatus as claimed in claim 4, wherein
at least one processor, individually and/or collectively, is
configured to:

correct the brightness information and contrast informa-
tion for each region based on the luminance histogram
information and the first gain information, and correct saturation information and color temperature
information for each region based on the color histo-
gram information and the second gain information.

6. The electronic apparatus as claimed in claim 5, wherein
at least one processor, individually and/or collectively, is
configured to:

identify maximum luminance information of the input
video based on the luminance histogram information, adjust a contrast gain for contrast information correction
based on the identified maximum luminance informa-
tion, identify maximum red, green, blue (RGB) information of
the input video based on the color histogram informa-
tion, adjust a saturation gain for saturation information correc-
tion based on the identified maximum R/G/B informa-
tion, identify amount information and magnitude information
of a contour included in the input video based on the
contour information, and adjust the gain for the sharpness correction based on the
identified amount information and magnitude informa-
tion of the contour.

7. The electronic apparatus as claimed in claim 1, wherein
at least one processor, individually and/or collectively, is
configured to:

acquire local gain information for each region by analyz-
ing a change in the image quality information depend-
ing on the projection distance information for each of
a plurality of regions included in the projection surface, acquire global gain information corresponding to an entire
region of the projection surface by analyzing a change
in the image quality information according to the
illuminance information, and acquire the gain information for each region based on the
local gain information and the global gain information.

8. The electronic apparatus as claimed in claim 7, wherein
the local gain information for each region includes a gain
map in a form of a gray image whose gain value increases
as the projection distance corresponding to each of the
plurality of regions increases, and the global gain information includes a gain map in the
form of the gray image whose gain value increases as
the brightness included in the illuminance information
increases.

9. The electronic apparatus as claimed in claim 1, wherein
at least one processor, individually and/or collectively, is
configured to:

adjust the gain information so that the gain information
for each region increases from a center region to an
edge region of the projection surface based on at least one of the projection distance information or size
information of the projection surface.

10. The electronic apparatus as claimed in claim 1,
wherein at least one processor, individually and/or collec-
tively, is configured to:

identify a region of interest within the input video, and acquire the output video by correcting the region of
interest based on the corrected gain information for
each region.

11. A method of controlling an electronic apparatus,
comprising:

acquiring projection distance information and illuminance
information to a projection surface;

acquiring gain information for each region included in the
projection surface at least by analyzing a change in
image quality information depending for each region
based on the projection distance information and the
illuminance information;

correcting the gain information for each region based on
correlation information between the projection distance
information and image quality information and corre-
lation information between the illuminance information
and the image quality information;

acquiring an output video by correcting the input video
based on the corrected gain information for each
region; and projecting the output video onto the projection surface.

12. The method as claimed in claim 11, wherein the image
quality information includes at least one of contrast infor-
mation, color information, and sharpness information, and
the acquiring of the output video includes:

acquiring first gain information corresponding to the
contrast information by correcting the gain information
for each region based on correlation information
between the projection distance information and the
contrast information and correlation information
between the illuminance information and the contrast
information;

acquiring second gain information corresponding to color
information by correcting the gain information for each
region based on correlation information between the
projection distance information and the color informa-
tion and correlation information between the illumi-
nance information and the color information;

acquiring third gain information corresponding to sharp-
ness information by correcting the gain information for
each region based on correlation information between
the projection distance information and the sharpness
information and correlation information between the
illuminance information and the sharpness information;
and acquiring the output video by correcting the input video
based on the first gain information, the second gain
information, and the third gain information.

13. The method as claimed in claim 12, wherein the
acquiring of the output video includes:

acquiring video characteristic information by analyzing
the input video, and acquiring the output video by correcting the input video
based on the video characteristic information, the first
gain information, the second gain information, and the
third gain information.

14. The method as claimed in claim 13, wherein the video
characteristic information includes at least one of luminance
histogram information, color histogram information, and
contour information, and the acquiring of the output video includes:

correcting the contrast information for each region based on the luminance histogram information and the first gain information;

correcting the color information for each region based on the color histogram information and the second gain information; and correcting the sharpness information for each region based on the contour information and the third gain information.

15. A non-transitory computer-readable medium storing instructions which, when executed by at least one processor of an electronic apparatus, individually and/or collectively, cause the electronic apparatus to perform operations including:

acquiring projection distance information and illuminance information to a projection surface;

acquiring gain information for each region included in the projection surface at least by analyzing a change in image quality information depending for each region on the projection distance information and the illuminance information;

correcting the gain information for each region based on correlation information between the projection distance information and image quality information and correlation information between the illuminance information and the image quality information;

acquiring an output video by correcting the input video based on the corrected gain information for each region; and projecting the output video onto the projection surface.

16. The non-transitory computer-readable medium as claimed in claim 15, wherein the image quality information includes at least one of contrast information, color information, and sharpness information, and the acquiring of the output video includes:

acquiring first gain information corresponding to the contrast information by correcting the gain information for each region based on correlation information between the projection distance information and the contrast information and correlation information between the illuminance information and the contrast information;

acquiring second gain information corresponding to color information by correcting the gain information for each region based on correlation information between the projection distance information and the color information and correlation information between the illuminance information and the color information;

acquiring third gain information corresponding to sharpness information by correcting the gain information for each region based on correlation information between the projection distance information and the sharpness information and correlation information between the illuminance information and the sharpness information; and acquiring the output video by correcting the input video based on the first gain information, the second gain information, and the third gain information.

17. The non-transitory computer-readable medium as claimed in claim 16, wherein the acquiring of the output video includes:

acquiring video characteristic information by analyzing the input video, and acquiring the output video by correcting the input video based on the video characteristic information, the first gain information, the second gain information, and the third gain information.

18. The non-transitory computer-readable medium as claimed in claim 17, wherein the video characteristic information includes at least one of luminance histogram information, color histogram information, and contour information, and the acquiring of the output video includes:

correcting the contrast information for each region based on the luminance histogram information and the first gain information;

correcting the color information for each region based on the color histogram information and the second gain information; and correcting the sharpness information for each region based on the contour information and the third gain information.

19. The non-transitory computer-readable medium as claimed in claim 18, wherein the correcting the contrast information for each region includes:

correcting the brightness information and contrast information for each region based on the luminance histogram information and the first gain information, and wherein the correcting the color information for each region includes:

correcting saturation information and color temperature information for each region based on the color histogram information and the second gain information.

20. The non-transitory computer-readable medium as claimed in claim 19, wherein the correcting the contrast information for each region includes:

identifying maximum luminance information of the input video based on the luminance histogram information, adjusting a contrast gain for contrast information correction based on the identified maximum luminance information, wherein the correcting the color information for each region includes:

identifying maximum red, green, blue (RGB) information of the input video based on the color histogram information, adjusting a saturation gain for saturation information correction based on the identified maximum R/G/B information, wherein the correcting the sharpness information includes:

identifying amount information and magnitude information of a contour included in the input video based on the contour information, and adjusting the gain for the sharpness correction based on the identified amount information and magnitude information of the contour.

21. The electronic apparatus as claimed in claim 1, wherein the gain information for each region increases as the projection distance for each region increases.

22. The method as claimed in claim 11, wherein the gain information for each region increases as the projection distance for each region increases.

23. The non-transitory computer-readable medium as claimed in claim 15, wherein the gain information for each region increases as the projection distance for each region increases.

* * * * *